United States Patent
Li et al.

(10) Patent No.: US 12,256,431 B2
(45) Date of Patent: Mar. 18, 2025

(54) RETRANSMISSIONS OVER A SIDELINK UNLICENSED BAND

(71) Applicant: QUALCOMM Incorporated, San Diego, CA (US)

(72) Inventors: Qing Li, Princeton Junction, NJ (US); Junyi Li, Fairless Hills, PA (US); Shuanshuan Wu, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 17/646,990

(22) Filed: Jan. 4, 2022

(65) Prior Publication Data

US 2023/0232454 A1    Jul. 20, 2023

(51) Int. Cl.
*H04W 74/0816*    (2024.01)
*H04L 1/08*    (2006.01)
(Continued)

(52) U.S. Cl.
CPC .......... *H04W 74/0816* (2013.01); *H04L 1/08* (2013.01); *H04L 1/1812* (2013.01);
(Continued)

(58) Field of Classification Search
CPC ............. H04W 74/0816; H04W 72/02; H04W 72/0446; H04W 72/20; H04W 74/002; H04W 74/0866; H04W 92/18; H04L 1/08; H04L 1/1812; H04L 5/0053; H04L 1/1887; H04L 1/1883; H04L 1/1867;
(Continued)

(56) References Cited

U.S. PATENT DOCUMENTS

2020/0323019 A1\* 10/2020 Vargas ................. H04W 76/15
2021/0227602 A1\* 7/2021 Li ..................... H04W 72/0446
(Continued)

OTHER PUBLICATIONS

Ericsson: "Remaining Aspects of SL DRX", 3GPP TSG-RAN WG2 #116-e, R2-2109907, 3rd Generation Partnership Project, Mobile Competence Centre, 650, Route Des Lucioles, F-06921 Sophia-Antipolis Cedex, France, vol. RAN WG2, No. Electronic meeting, Nov. 1, 2021-Nov. 12, 2021, Oct. 21, 2021, 12 Pages, XP052066363, pp. 5,6.
(Continued)

*Primary Examiner* — Michael A Keller
*Assistant Examiner* — Chhian (Amy) Ling
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may transmit, to a second UE, an initial transmission of a transport block via a sidelink unlicensed band. The UE may receive, from the second UE, a negative acknowledgement (NACK) based at least in part on the initial transmission of the transport block. The UE may transmit, to the second UE and based at least in part on the NACK and a retransmission reservation, a retransmission of the transport block via the sidelink unlicensed band in a retransmission occasion of a plurality of retransmission occasions associated with the retransmission reservation. Numerous other aspects are described.

30 Claims, 11 Drawing Sheets

(51) Int. Cl.
*H04L 1/1812* (2023.01)
*H04L 1/1867* (2023.01)
*H04L 5/00* (2006.01)
*H04W 72/02* (2009.01)
*H04W 72/0446* (2023.01)
*H04W 72/20* (2023.01)
*H04W 74/00* (2009.01)
*H04W 74/08* (2024.01)

(52) U.S. Cl.
CPC .......... *H04L 1/1867* (2013.01); *H04L 1/1883* (2013.01); *H04L 5/0053* (2013.01); *H04W 72/02* (2013.01); *H04W 72/0446* (2013.01); *H04W 72/20* (2023.01); *H04W 74/002* (2013.01); *H04W 74/0866* (2013.01)

(58) Field of Classification Search
CPC ........... H04L 2001/0092; H04L 1/1825; H04L 1/1848; H04L 5/0055
See application file for complete search history.

(56) References Cited

U.S. PATENT DOCUMENTS

| | | | |
|---|---|---|---|
| 2021/0266951 A1 | 8/2021 | Gulati et al. | |
| 2021/0410114 A1 | 12/2021 | Lee et al. | |
| 2022/0264586 A1* | 8/2022 | Qi | H04L 1/1812 |
| 2023/0180291 A1* | 6/2023 | Du | H04L 1/1893 370/329 |
| 2024/0114527 A1* | 4/2024 | Zhao | H04L 1/1887 |
| 2024/0163962 A1* | 5/2024 | Freda | H04W 76/23 |

OTHER PUBLICATIONS

International Search Report and Written Opinion—PCT/US2022/078898—ISA/EPO—Feb. 23, 2023.

* cited by examiner

RETRANSMISSIONS OVER A SIDELINK UNLICENSED BAND

FIELD OF THE DISCLOSURE

Aspects of the present disclosure generally relate to wireless communication and to techniques and apparatuses for retransmissions over a sidelink unlicensed band.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Tenn Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory, and one or more processors, coupled to the memory, configured to: transmit, to a second UE, an initial transmission of a transport block via a sidelink unlicensed band; receive, from the second UE, a negative acknowledgement (NACK) based at least in part on the initial transmission of the transport block; and transmit, to the second UE and based at least in part on the NACK and a retransmission reservation, a retransmission of the transport block via the sidelink unlicensed band in a retransmission occasion of a plurality of retransmission occasions associated with the retransmission reservation.

In some implementations, an apparatus for wireless communication at a second UE includes a memory, and one or more processors, coupled to the memory, configured to: transmit, to a first UE, a NACK based at least in part on an initial transmission of a transport block via a sidelink unlicensed band; and receive, from the first UE and based at least in part on the NACK and a retransmission reservation, a retransmission of the transport block via the sidelink unlicensed band in a retransmission occasion of a plurality of retransmission occasions associated with retransmission reservation.

In some implementations, a method of wireless communication performed by a first UE includes transmitting, to a second UE, an initial transmission of a transport block via a sidelink unlicensed band; receiving, from the second UE, a NACK based at least in part on the initial transmission of the transport block; and transmitting, to the second UE and based at least in part on the NACK and a retransmission reservation, a retransmission of the transport block via the sidelink unlicensed band in a retransmission occasion of a plurality of retransmission occasions associated with the retransmission reservation.

In some implementations, a method of wireless communication performed by a second UE includes transmitting, to a first UE, a NACK based at least in part on an initial transmission of a transport block via a sidelink unlicensed band; and receiving, from the first UE and based at least in part on the NACK and a retransmission reservation, a retransmission of the transport block via the sidelink unlicensed band in a retransmission occasion of a plurality of retransmission occasions associated with retransmission reservation.

In some implementations, a non-transitory computer-readable medium storing a set of instructions for wireless communication includes one or more instructions that, when executed by one or more processors of a first UE, cause the first UE to: transmit, to a second UE, an initial transmission of a transport block via a sidelink unlicensed band; receive, from the second UE, a NACK based at least in part on the initial transmission of the transport block; and transmit, to the second UE and based at least in part on the NACK and a retransmission reservation, a retransmission of the transport block via the sidelink unlicensed band in a retransmission occasion of a plurality of retransmission occasions associated with the retransmission reservation.

In some implementations, a non-transitory computer-readable medium storing a set of instructions for wireless communication includes one or more instructions that, when executed by one or more processors of a second UE, cause the second UE to: transmit, to a first UE, a NACK based at least in part on an initial transmission of a transport block via a sidelink unlicensed band; and receive, from the first UE and based at least in part on the NACK and a retransmission reservation, a retransmission of the transport block via the sidelink unlicensed band in a retransmission occasion of a plurality of retransmission occasions associated with retransmission reservation.

In some implementations, a first apparatus for wireless communication includes means for transmitting, to a second apparatus, an initial transmission of a transport block via a sidelink unlicensed band; means for receiving, from the second apparatus, a NACK based at least in part on the initial transmission of the transport block; and means for transmitting, to the second apparatus and based at least in part on the NACK and a retransmission reservation, a retransmission of the transport block via the sidelink unlicensed band in a retransmission occasion of a plurality of retransmission occasions associated with the retransmission reservation.

In some implementations, a second apparatus for wireless communication includes means for transmitting, to a first apparatus, a NACK based at least in part on an initial transmission of a transport block via a sidelink unlicensed band; and means for receiving, from the first apparatus and based at least in part on the NACK and a retransmission reservation, a retransmission of the transport block via the sidelink unlicensed band in a retransmission occasion of a plurality of retransmission occasions associated with retransmission reservation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
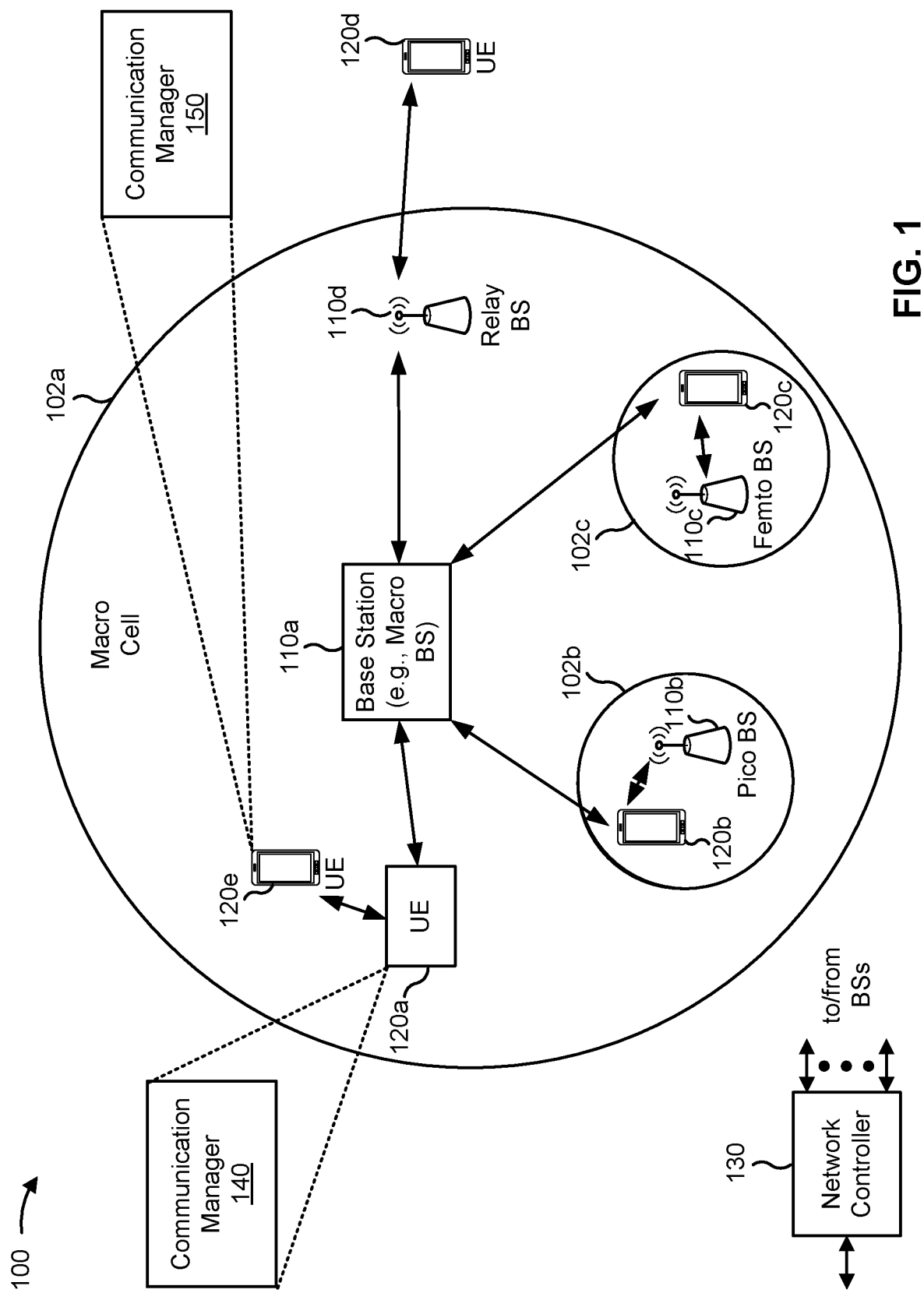
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may transmit, to a second UE, an initial transmission of a transport block via a sidelink unlicensed band; receive, from the second UE, a negative acknowledgement (NACK) based at least in part on the initial transmission of the transport block; and transmit, to the second UE and based at least in part on the NACK and a retransmission reservation, a retransmission of the transport block via the sidelink unlicensed band in a retransmission occasion of a plurality of retransmission occasions associated with the retransmission reservation. Additionally, or alternatively, the communication manager 140 may perform one or more other operations described herein.

In some aspects, a second UE (e.g., UE 120e) may include a communication manager 140. As described in more detail elsewhere herein, the communication manager 140 may transmit, to a first UE, a NACK based at least in part on an initial transmission of a transport block via a sidelink unlicensed band; and receive, from the first UE and based at least in part on the NACK and a retransmission reservation, a retransmission of the transport block via the sidelink unlicensed band in a retransmission occasion of a plurality of retransmission occasions associated with retransmission reservation. Additionally, or alternatively, the communication manager 140 may perform one or more other operations described herein.

As indicated above, FIG. 1 is provided as an example. Other examples may differ from what is described with regard to FIG. 1.

Figure 2:
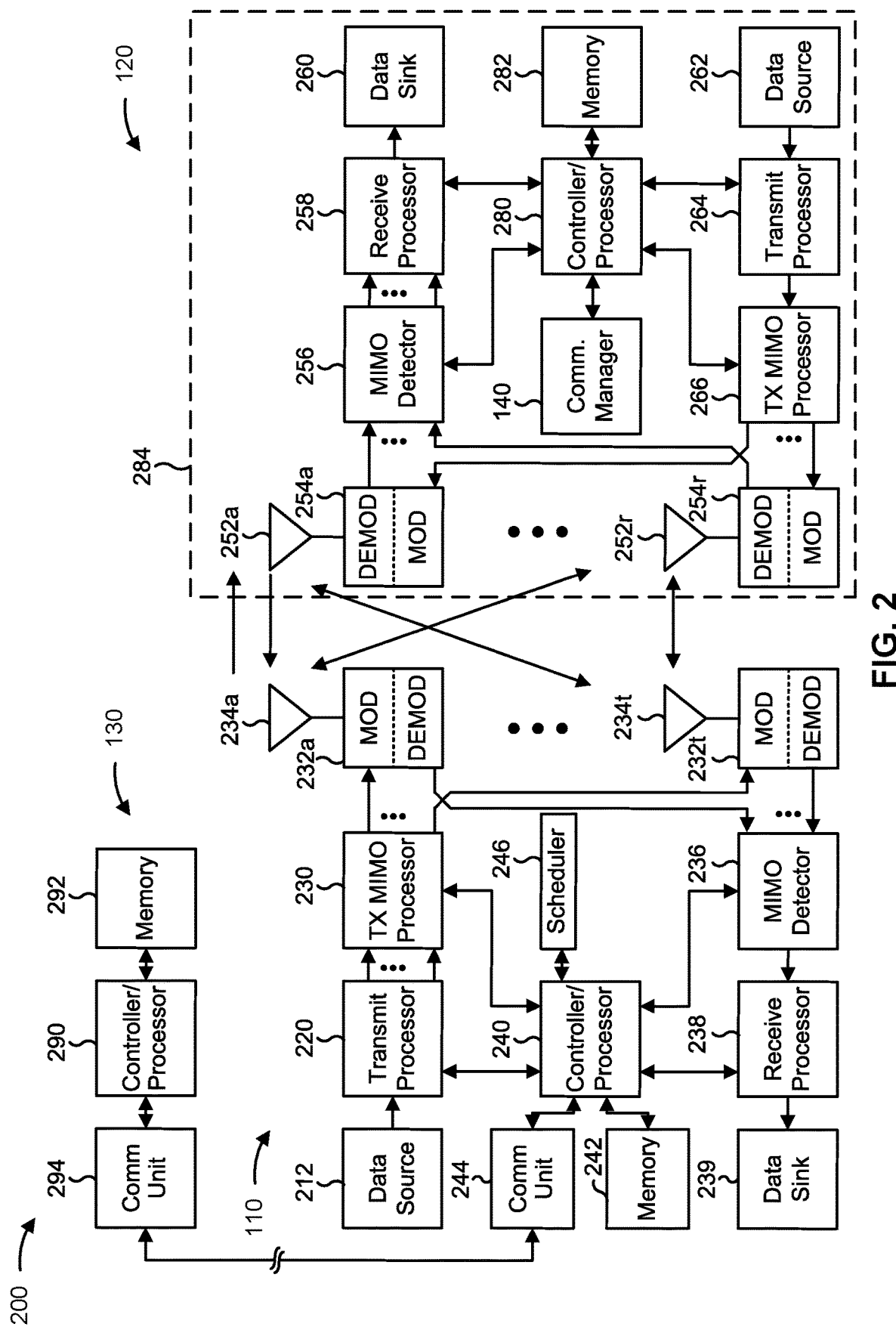
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna army may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with retransmissions over a sidelink unlicensed band, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., 120*a*) includes means for transmitting, to a second UE, an initial transmission of a transport block via a sidelink unlicensed band; means for receiving, from the second UE, a NACK based at least in part on the initial transmission of the transport block; and/or means for transmitting, to the second UE and based at least in part on the NACK and a retransmission reservation, a retransmission of the transport block via the sidelink unlicensed band in a retransmission occasion of a plurality of retransmission occasions associated with the retransmission reservation. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., 120*e*) includes means for transmitting, to a first UE, a NACK based at least in part on an initial transmission of a transport block via a sidelink unlicensed band; and/or means for receiving, from the first UE and based at least in part on the NACK and a retransmission reservation, a retransmission of the transport block via the sidelink unlicensed band in a retransmission occasion of a plurality of retransmission occasions associated with retransmission reservation. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Hybrid automatic repeat request (HARQ) feedback transmissions may be supported on sidelink in a wireless network. For example, a HARQ acknowledgement (ACK) or NACK based retransmission may be supported for unicast, a HARQ ACK/NACK based retransmission may be supported for managed groupcast, and/or a HARQ NACK based retransmission may be supported for connectionless groupcast. Non-HARQ feedback retransmissions may be supported on sidelink in the wireless network. For example, a blind retransmission without any ACK/NACK feedback (e.g., HARQ feedback) may be supported for a plurality of cast types (e.g., unicast, managed groupcast, connectionless groupcast, and/or broadcast). Sidelink discontinuous reception (DRX) timers may be used for retransmissions. Sidelink DRX timers may include a sidelink HARQ round-trip time (RTT) timer, a sidelink HARQ retransmission timer, and/or a sidelink inactivity timer. Another set of timers (e.g., HARQ RTT timer, HARQ retransmission timer, and/or inactivity timer) may be used for monitoring base station sidelink scheduling downlink control informations (DCIs) for Mode 1 operations. The sidelink HARQ RTT timer may be derived from a next retransmission indicated by sidelink control information (SCI).

Figure 3:
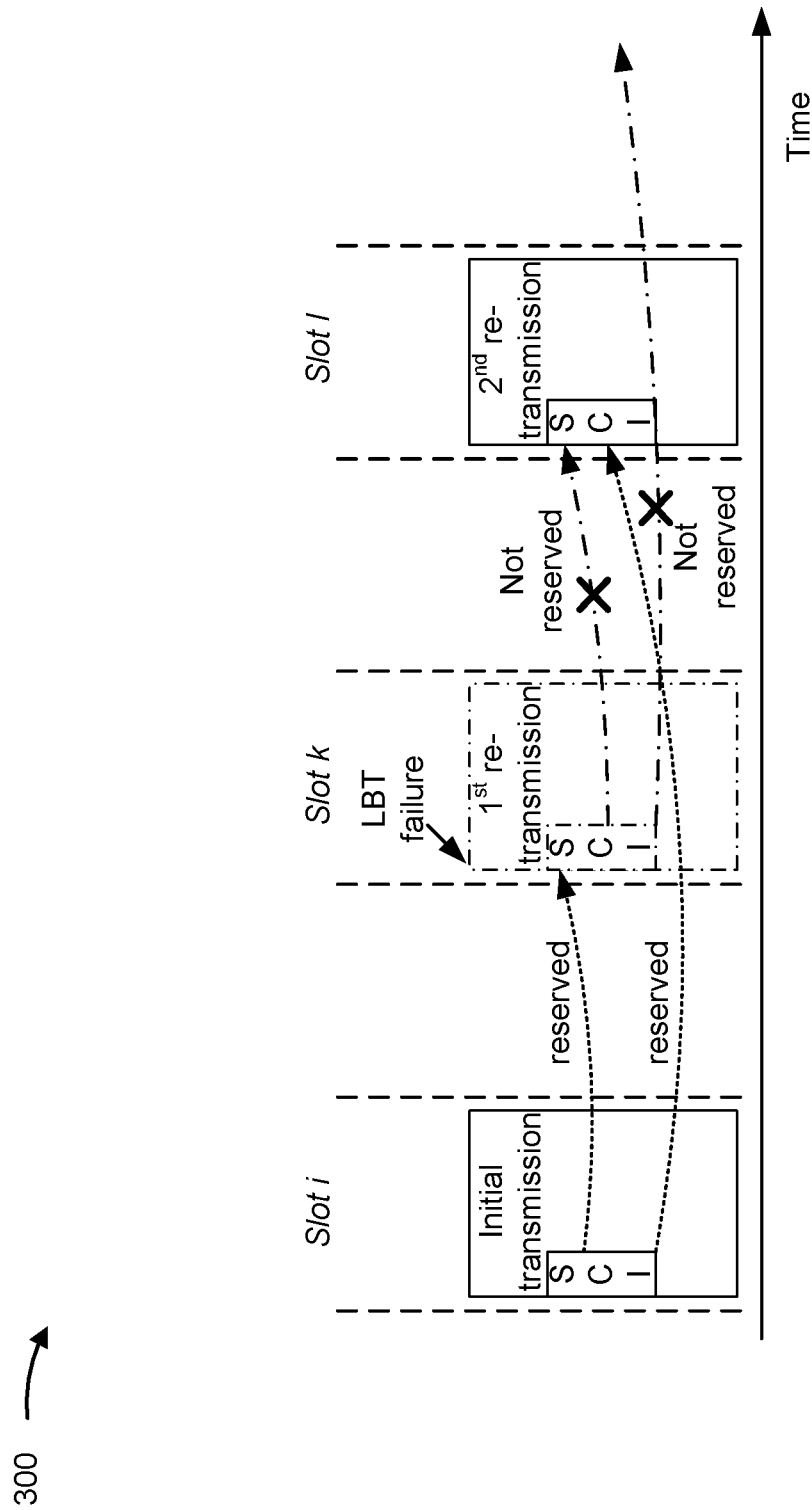
FIG. 3 is a diagram illustrating an example of a retransmission based at least in part on a listen before talk (LBT) failure, in accordance with the present disclosure.

FIG. 3 is a diagram illustrating an example 300 of a retransmission based at least in part on an LBT failure, in accordance with the present disclosure.

As shown by FIG. 3, a Tx UE may transmit, to an Rx UE via a sidelink interface between the Tx UE and the Rx UE, an SCI associated with an initial transmission. The Tx UE may transmit the SCI in slot i. The SCI may indicate one or two resources reserved for one or two retransmissions, respectively. For example, the SCI may indicate a first resource reserved for a first retransmission in slot k, and the SCI may indicate a second resource reserved for a second retransmission in slot l.

For sidelink communication on an unlicensed spectrum, reserved retransmissions may not be conducted, due to LBT failure. As a result, a chain of resource reservations for retransmissions may be broken.

As further shown by FIG. 3, the first retransmission, which may be reserved by the SCI, may not be conducted, due to LBT failure at slot k. In this case, the missing first retransmission due to the LBT failure may cause degraded sidelink performance between the Tx UE and the Rx UE (e.g., increased delay for retransmissions due to the LBT failure). Further, SCI associated with the first retransmission, which may be missing due to the LBT failure, may result in resources not being reserved in subsequent slots (e.g., slot l and beyond).

When the missing first retransmission is due to the LBT failure, the second retransmission indicated by the SCI associated with the initial transmission may still be valid, and the Rx UE may set sidelink DRX timers accordingly. In some cases, the missing first retransmission may be due to a preemption or priority-based dropping, such that the second retransmission indicated by the SCI associated with the initial transmission may not be valid since the Tx UE may reselect resources for retransmission. Therefore, the Rx UE may set a sidelink DRX timer based at least in part on a resource reselection of the Tx UE.

The Tx UE may set sidelink DRX timers for second retransmissions based at least in part on the LBT failure for the missed first retransmission (e.g., as indicated in the SCI associated with the initial transmission) or preemption or priority-based dropping for the first retransmission (e.g., based at least in part on a resource reselection) and the Rx UE may not be able to determine if the missed first retransmission is due to the LBT failure or due to preemption or priority-based dropping and set sidelink DRX timers properly. In this case, sidelink DRX timers may not be aligned properly between the Tx UE and the Rx UE. The misaligned sidelink DRX timers may cause sidelink performance degradation or failure between the Tx UE and the Rx UE.

As indicated above, FIG. 3 is provided as an example. Other examples may differ from what is described with regard to FIG. 3.

For sidelink communication on the unlicensed spectrum, LBT failures may prevent reserved retransmissions from being performed, which may misalign sidelink DRX timer operations between the Tx UE and the Rx UE and degrade performance due to increased delays for retransmissions. As a result, more reliable LBT based retransmissions may be needed for sidelink communication.

In various aspects of techniques and apparatuses described herein, a Tx UE may transmit, to an Rx UE, an initial transmission of a transport block in a slot via a sidelink unlicensed band. The Tx UE may receive, from the Rx UE, a NACK based at least in part on the initial transmission of the transport block in the slot. The Tx UE may transmit, to the Rx UE and based at least in part on the NACK and a retransmission reservation, a retransmission of the transport block via the sidelink unlicensed band in a retransmission occasion of a quantity of retransmission occasions associated with the retransmission reservation. The quantity of retransmission occasions may be associated with multiple retransmission occasions.

In some aspects, the multiple retransmission occasions for each retransmission reservation may provide increased reliability for LBT based retransmissions. For example, a Tx UE, with multiple retransmission occasions, may conduct LBT for accessing the sidelink channel at the second retransmission occasion after LBT failure at the first retransmission occasion or at the third retransmission occasion after LBT failures at the first and second occasions, without waiting for a next retransmission. In this case, a possibility of a successful LBT for a retransmission may be increased with the number of retransmission occasions. As a result, the multiple retransmission occasions may help prevent a break in a reservation chain as compared to when the retransmission is only associated with a single retransmission occasion. The multiple retransmission occasions may be preconfigured or configured via radio resource control (RRC) signaling for different qualities of service (QoSs) or channel busy ratios (CBRs) or LBT failure rates or LBT success rates. For example, plural quantities of retransmission occasions may be configured corresponding to plural QoS profiles or QoS parameters associated to different services, or plural values of CBRs, or plural values of LBT failure rates, and/or plural values of LBT success rates, e.g., configured with a look up table (LUT) with plural entries for the plural quantities of retransmission occasions. The multiple retransmission occasions may be activated via a medium access control control element (MAC-CE). The multiple retransmission occasions may be dynamically indicated in SCI, where the SCI may indicate a space in time between adjacent retransmission occasions for a retransmission. With the multiple retransmission occasions, a Tx UE or Rx UE(s) may extend a sidelink inactivity timer over the retransmission occasions (e.g., all retransmission occasions) for a retransmission and may stay active for a possible retransmission at one of the multiple retransmission occasions. Further, the Tx UE or Rx UE(s) may extend a sidelink HARQ retransmission timer over the retransmission occasions (e.g., all retransmission occasions) or remaining retransmission occasions for transmitting or monitoring a retransmission when a sidelink HARQ RTT timer expires. In this case, the sidelink DRX timer operations may be aligned between the Tx UE and the Rx UE.

In some aspects, in a sidelink operation over the sidelink unlicensed band, an LBT mechanism may cause the Tx UE to be unable to perform a retransmission, which may break a chain of reservation for the retransmission using SCI. The SCI may only reserve one or two subsequent retransmissions. The break to the chain of reservation may be problematic for the Rx UE when sidelink DRX is turned on, since the break may cause improper operations with a sidelink DRX timer and cause the Rx UE to enter an inactive state.

For example, a UE may set its sidelink HARQ retransmission timer for an immediate next blind retransmission based at least in part on a retransmission indicated in a received SCI (e.g., set a sidelink HARQ retransmission timer to run at a second retransmission indicated in an SCI transmitted in a first retransmission). For another example, a UE may set its sidelink HARQ RTT timer and sidelink HARQ retransmission timer for an immediate next HARQ retransmission based at least in part on a retransmission indicated in a received SCI (e.g., set a HARQ RTT timer to run until prior to a second retransmission indicated in an SCI transmitted in a first retransmission). In both examples, a missing retransmission may disrupt sidelink HARQ retransmission timer or sidelink HARQ RTT timer operation and may cause a UE to enter into an inactive state. In some aspects, to reduce the possibility of missing retransmissions due to an LBT failure, SCI reservations for sidelink retransmissions may indicate multiple retransmission occasions for a retransmission, such that the Tx UE may be able to perform at least one retransmission to continue proper sidelink DRX timer operations. The multiple retransmission occasions may be based at least in part on an RRC-based configuration, a MAC-CE based activation, or an SCI-based dynamic indication.

Figure 4:
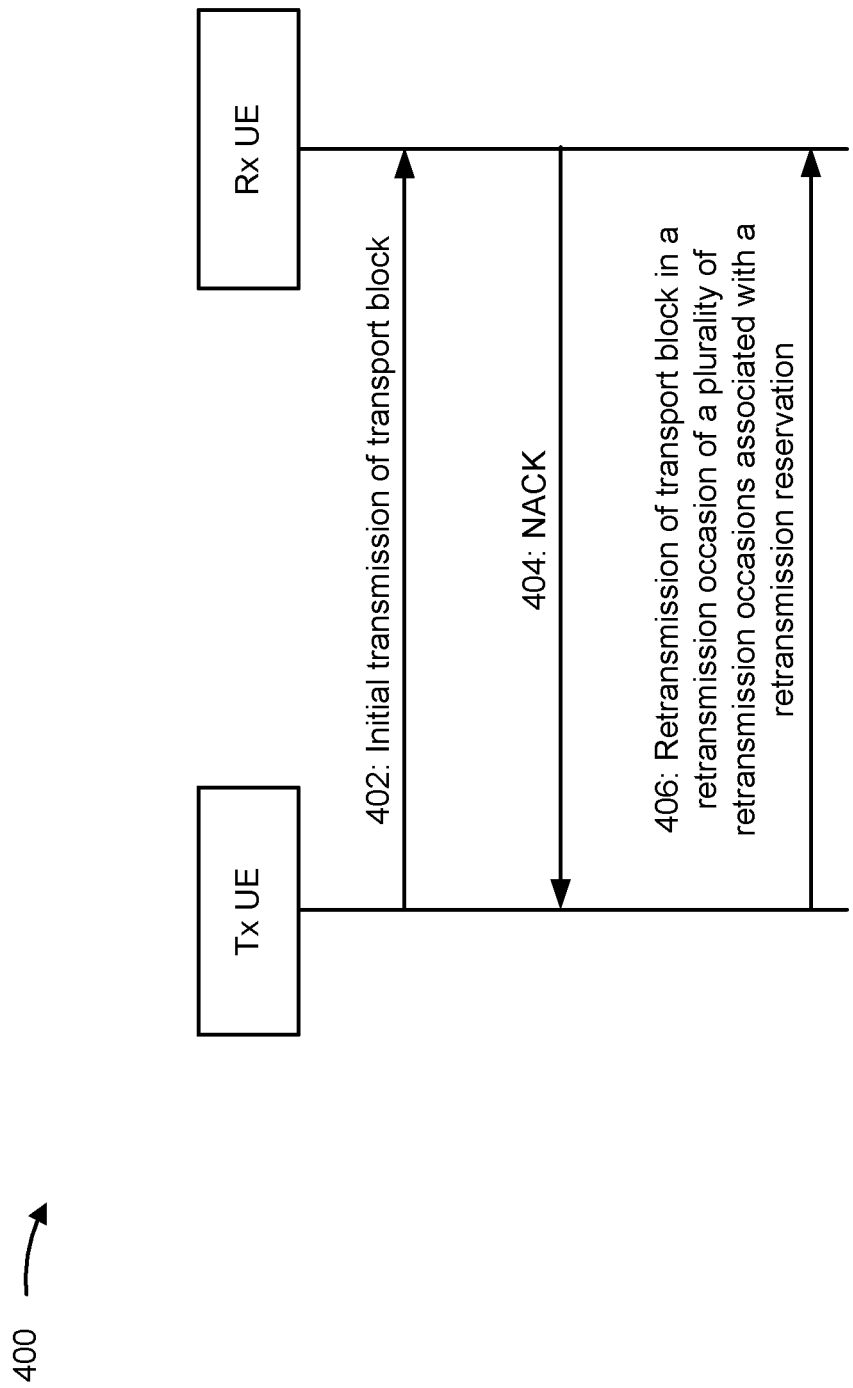
FIGS. 4-7 are diagrams illustrating examples associated with retransmissions over a sidelink unlicensed band, in accordance with the present disclosure.

FIG. 4 is a diagram illustrating an example 400 associated with retransmissions over a sidelink unlicensed band, in accordance with the present disclosure. As shown in FIG. 4, example 400 includes communication between a Tx UE (e.g., UE 120a) and an Rx UE (e.g., UE 120e). In some aspects, the Tx UE and the Rx UE may be included in a wireless network, such as wireless network 100. In some aspects, at least the Tx UE, or the Rx UE may not be included in a wireless network, such as wireless network 100, e.g., out of the coverage of the base station 110. The Tx UE may be a first UE and the Rx UE may be a second UE.

As shown by reference number 402, the Tx UE may transmit, to the Rx UE, an initial transmission of a transport block in a slot. The Tx UE may transmit the initial transmission via a sidelink unlicensed band. The initial transmission of the transport block may be an LBT-based transmission. In other words, the Tx UE may transmit the initial transmission of the transport block in the slot based at least in part on a successful LBT in the slot. In some aspects, the Tx UE may transmit the initial transmission in a mini-slot, e.g., a sub-slot with 2, 4 or 7 symbols within a slot with 14 symbols.

As shown by reference number 404, the Tx UE may receive, from the Rx UE, a NACK based at least in part on the initial transmission of the transport block in the slot. The Rx UE may transmit the NACK after not successfully decoding the initial transmission of the transport block from the Tx UE.

As shown by reference number 406, the Tx UE may transmit, to the Rx UE, a retransmission of the transport block via the sidelink unlicensed band in a retransmission occasion of a plurality of retransmission occasions. The Tx UE may transmit the retransmission of the transport block based at least in part on the NACK. The plurality of retransmission occasions may include a quantity of retransmission occasions (e.g., more than one retransmission occasion). In some aspects, the retransmission of the transport block may be an LBT-based retransmission. In other words, the Tx UE may transmit the retransmission of the transport block based at least in part on a successful LBT in a slot (or a mini-slot) associated with the retransmission of the transport block.

In some aspects, the plurality of retransmission occasions may be associated with a retransmission reservation. For example, multiple retransmission occasions may be assigned for each retransmission reservation. Each retransmission of the transport block may be associated with a respective retransmission reservation that includes the plurality of retransmission occasions. The retransmission of the transport block may be transmitted in any of the plurality of retransmission occasions assigned to the respective retransmission reservation. In some aspects, retransmissions are not able to be transmitted (e.g., are prevented from being transmitted) in retransmission occasions assigned to a retransmission reservation associated with another retransmission. For example, a second retransmission may not be transmitted (e.g., is not transmittable) in any of the plurality of retransmission occasions associated with a retransmission reservation for a first retransmission. The retransmission reservation may be indicated in SCI transmitted with the initial transmission or with a previous retransmission.

In some aspects, the Tx UE and/or the Rx UE may be preconfigured or configured with a sidelink unlicensed configuration that indicates a plurality of different quantities of retransmission occasions and corresponding spaces between adjacent retransmission occasions. The Tx UE and/or the Rx UE may be configured with the sidelink unlicensed configuration from a base station via RRC signaling when the Tx UE and/or the Rx UE are in coverage. A UE may be configured with the sidelink unlicensed configuration from a special UE (e.g., a group lead, a cluster head, an RSU as a lead in proximity, a scheduling UE, or a Tx UE, etc.) via sidelink RRC signaling. The sidelink unlicensed configuration may be pre-configured by a manufacturer or a service center when the Tx UE and/or the Rx UE are out of base station coverage, or the base station when the Tx UE and/or the Rx UE are initially in-coverage. In some aspects, a quantity of retransmission occasions may be associated with a QoS profile or a QoS parameter of a service, a CBR level, an LBT failure rate, and/or an LBT success rate. In some aspects, the Tx UE may select a quantity for the plurality of retransmission occasions, from among the different quantities of retransmission occasions indicated in the sidelink unlicensed configuration, based at least in part on a QoS profile or a QoS parameter of the service associated with the transport block, a CBR level measured by the first UE or reported by the second UE or a combination of both, and/or an LBT failure rate or an LBT success rate measured by the first UE or reported by the second UE or a combination of both.

In some aspects, the Tx UE may determine the quantity of the plurality of retransmission occasions based at least in part on a QoS profile or a QoS parameter of a service, a CBR level, an LBT failure rate, and/or an LBT success rate. The Tx UE may transmit, to the Rx UE, a reconfiguration via sidelink RRC signaling or an activation via a sidelink MAC-CE that indicates the quantity of the retransmission occasions. The Tx UE may receive a confirmation from the Rx UE based at least in part on the reconfiguration via the sidelink RRC signaling or the activation via the sidelink MAC-CE.

In some aspects, the Tx UE may determine that the transport block is available for transmission. The Tx UE may determine a quantity of the plurality of retransmission occasions based at least in part on a QoS profile or a QoS parameter associated to the transport block (including: a priority, a reliability, a packet delay budget (PDB) or remaining PDB), a CBR level, an LBT failure rate, and/or an LBT success rate. In some aspects, a higher number of retransmission occasions may be determined for higher priority, more reliability, and/or shorter PDB or remaining PDB (e.g., a latency constraint). In some aspects, a lower number of retransmission occasions may be determined for higher CBR to reduce channel congestion. In some aspects, a higher number of retransmission occasions may be determined for a higher LBT failure rate or a lower number of retransmission occasions may be determined for a higher LBT success rate. In some aspects, a number of retransmission occasions may be determined with a combination, e.g., based at least in part on the combination of the priority or the reliability or the PDB and the CBR or the LBT failure rate or the LBT success rate. The Tx UE may select a resource pool with the quantity of the retransmission occasions that satisfies a PDB or remaining PDB constraint. The plurality of retransmission occasions may be based at least in part on the resource pool and the quantity of the retransmission occasions.

In some aspects, the Tx UE may transmit SCI associated with the initial transmission of the transport block. The Tx UE may transmit the SCI along with the initial transmission of the transport block. The SCI may indicate the quantity of the retransmission occasions and a space in time between adjacent retransmission occasions. The Tx UE may transmit the retransmission of the transport block in the retransmission occasion based at least in part on the SCI that indicates the quantity of the retransmission occasions and the space in time between adjacent retransmission occasions. The Rx UE may monitor for the retransmission of the transport block. In some aspects, the retransmission of the transport block may be associated with another SCI, which may indicate a quantity of retransmission occasions with a value "0" that releases remaining retransmission occasions for the retransmission of the transport block.

In some aspects, the Tx UE and/or the Rx UE may start a sidelink inactivity timer having a length based at least in part on a time duration of the plurality of retransmission occasions after transmitting or receiving, respectively, the SCI with the initial transmission of the transport block. The Tx UE and/or the Rx UE may start a sidelink HARQ RTT timer based at least in part on receiving or transmitting, respectively, the NACK. The Tx UE and/or the Rx UE may start a sidelink HARQ retransmission timer having a length based at least in part on the time duration of the plurality of retransmission occasions or a remaining quantity of retransmission occasions based at least in part on an expiry of the sidelink HARQ RTT timer, where the expiry of the sidelink HARQ RTT timer may correspond to a timing of the retransmission of the transport block indicated in the SCI (e.g., derive the time duration of the sidelink HARQ RTT timer based at least in part on the resource indication for the immediate next retransmission in the SCI). The Tx UE and/or the Rx UE may stop the sidelink inactivity timer with an ACK to a retransmission at a retransmission occasion or at an end of the plurality of retransmission occasions. In some aspects, for an ACK/NACK based HARQ retransmission, the Tx UE may start its sidelink HARQ RTT timer after missing an ACK or NACK and start its sidelink HARQ retransmission timer after the expiration of its sidelink HARQ RTT timer (e.g., treating no HARQ feedback as a discontinuous transmission (DTX) which enables a retransmission) and the Rx UE may keep monitoring transmissions from the Tx UE at the retransmission occasions while its inactivity timer is running.

As indicated above, FIG. 4 is provided as an example. Other examples may differ from what is described with regard to FIG. 4.

Figure 5:
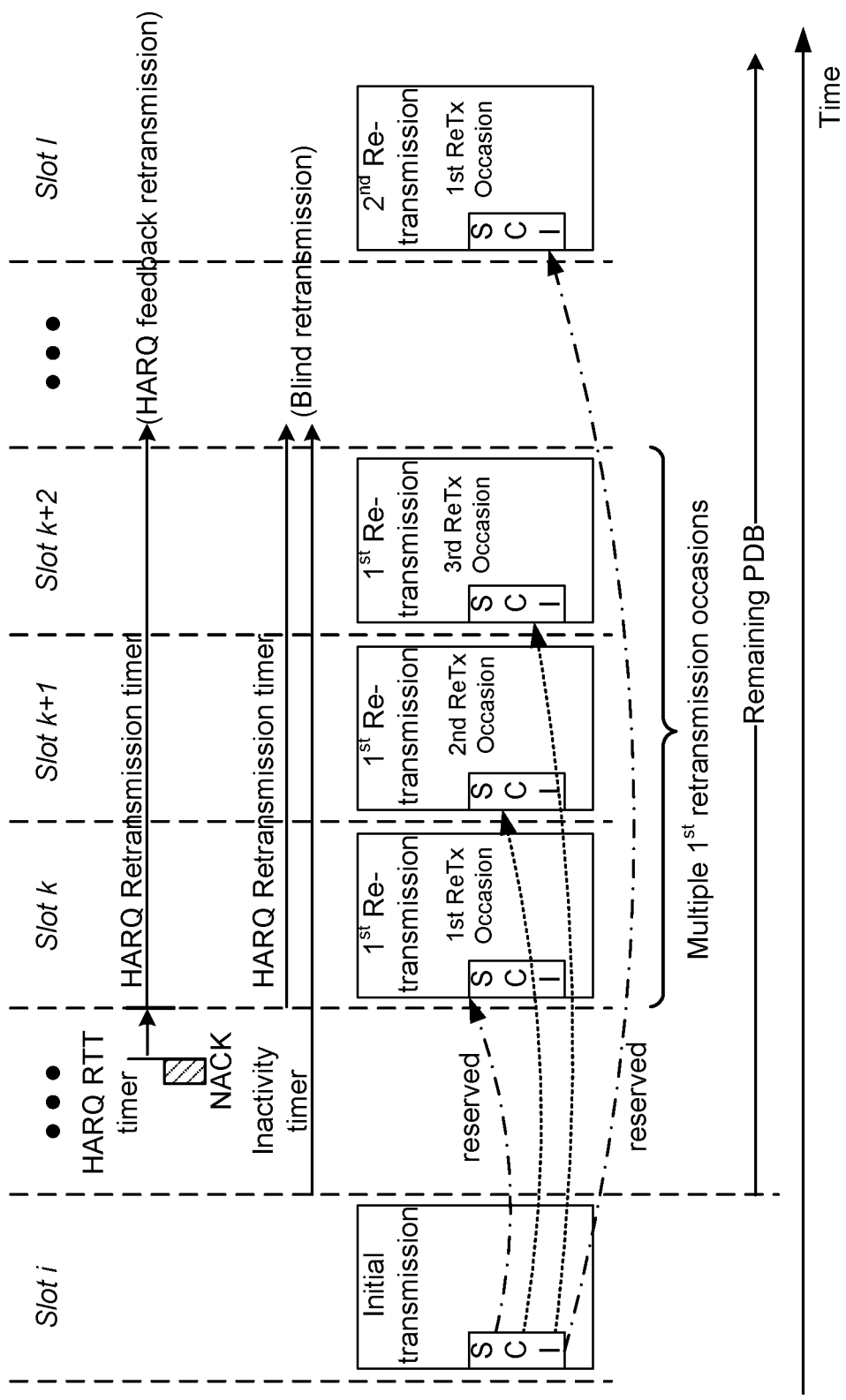

FIG. 5 is a diagram illustrating an example 500 associated with retransmissions over a sidelink unlicensed band, in accordance with the present disclosure.

As shown in FIG. 5, a Tx UE (or first UE) may transmit, to an Rx UE (or second UE), an initial transmission in slot i. The Tx UE may transmit SCI (e.g., SCI part 1 or SCI-1), which may be associated with the initial transmission. The SCI may indicate multiple retransmission occasions for a first retransmission and/or a second retransmission. The SCI may indicate the multiple retransmission occasions based at least in part on an indication of a first resource in time and frequency for a first occasion of the first retransmission (e.g., in slot k), and a second resource in time and frequency for a first occasion of the second retransmission (e.g., in slot l). The SCI may indicate the multiple retransmission occasions based at least in part on an indication of other occasions relative to a resource of a previous occasion for a retransmission. For example, the SCI may indicate a third resource for a second occasion for the first retransmission in slot k+1, and a fourth resource for a third occasion for the first retransmission in slot k+2, relative from the resource of the previous occasion of the first retransmission (e.g., in slot k).

In some aspects, the SCI may indicate the other occasions relative from the resource of the previous occasion for a retransmission based at least in part on a retransmission occasion space (retx_occasion_space) field and a retransmission occasions (retx_occasions) field. The retransmission occasion space field may indicate a space in time (e.g., a quantity of slots or mini slots) between two adjacent retransmission occasions (e.g., retx_occasion_space=0 for contiguous occasions in slots or mini-slots, retx_occasion_space=1 for one slot or one mini-slot between two adjacent retransmission occasions). The retransmission occasions field may indicate a quantity of retransmission occasions (e.g., retx_occasions=3 for three retransmission occasions of a retransmission).

In some aspects, the Tx UE may perform the initial transmission with a successful LBT. A sidelink inactivity timer may be started after transmitting the initial transmission by the Tx UE and a sidelink inactivity timer may be started after receiving the initial transmission by the Rx UE. The Tx UE may receive a NACK from the Rx UE based at least in part on an unsuccessful decoding of the initial transmission at the Rx UE. A sidelink HARQ RTT timer may be started after a receipt of the NACK and may end at or prior to a start of the first occasion for the first retransmission by the Tx UE, and a sidelink HARQ RTT timer may be started after a transmission of the NACK and may end at or prior to a start of the first occasion for the first retransmission, indicated in the received SCI, by the Rx UE. A sidelink HARQ retransmission timer may be started at or prior to the start of the first occasion for the first retransmission or when the sidelink HARQ RTT timer expires at the Tx UE or at the Rx UE. In some aspects, with the multiple retransmission occasions for each retransmission reservation (e.g., the multiple retransmission occasions for each of the first retransmission and the second retransmission), the Tx UE and the Rx UE may extend their inactivity timers or the HARQ retransmission timers over a plurality of retransmission occasions (e.g., all retransmission occasions) respectively indicated in and derived from the SCI (e.g., at slot k, slot k+1, and slot k+2) for the first retransmission. HARQ feedback retransmissions or blind retransmissions may be performed based at least in part on the HARQ retransmission timer and/or the inactivity timer for the time duration of multiple retransmission occasions at the Tx UE and the Rx UE.

In some aspects, the first retransmission and the second retransmission may be LBT based retransmissions. For example, the Tx UE may perform an LBT in slot k, and when the LBT passes, the Tx UE may be able to perform the first retransmission in the resource for the first occasion of the first retransmission. When the LBT does not pass, the Tx UE may perform an LBT in slot k+1, and so on. The Rx UE may stay active for monitoring a blind retransmission at one of the multiple retransmission occasions while its sidelink inactivity timer or sidelink HARQ retransmission timer is running over the time duration of multiple retransmission occasions or the Rx UE may stay active for monitoring a HARQ retransmission at one of the multiple retransmission occasions while its sidelink HARQ retransmission timer is running over the time duration of multiple retransmission occasions. The Tx UE may stop its sidelink inactivity timer or sidelink HARQ retransmission timer after receiving an ACK to the retransmission for ACK/NACK based HARQ retransmission or not receiving a NACK to the retransmission for NACK only based HARQ retransmission. The Rx UE may stop its sidelink inactivity timer or sidelink HARQ retransmission timer after sending an ACK to the retransmission for ACK/NACK based HARQ retransmission or not sending a NACK to the retransmission for NACK only based HARQ retransmission. Further, a remaining PDB may encompass multiple retransmission occasions of the first retransmission and the second retransmission and so on (e.g., all retransmissions are reserved within the remaining PDB), where the remaining PDB may be started at an end of the initial transmission.

As indicated above, FIG. 5 is provided as an example. Other examples may differ from what is described with regard to FIG. 5.

Figure 6:
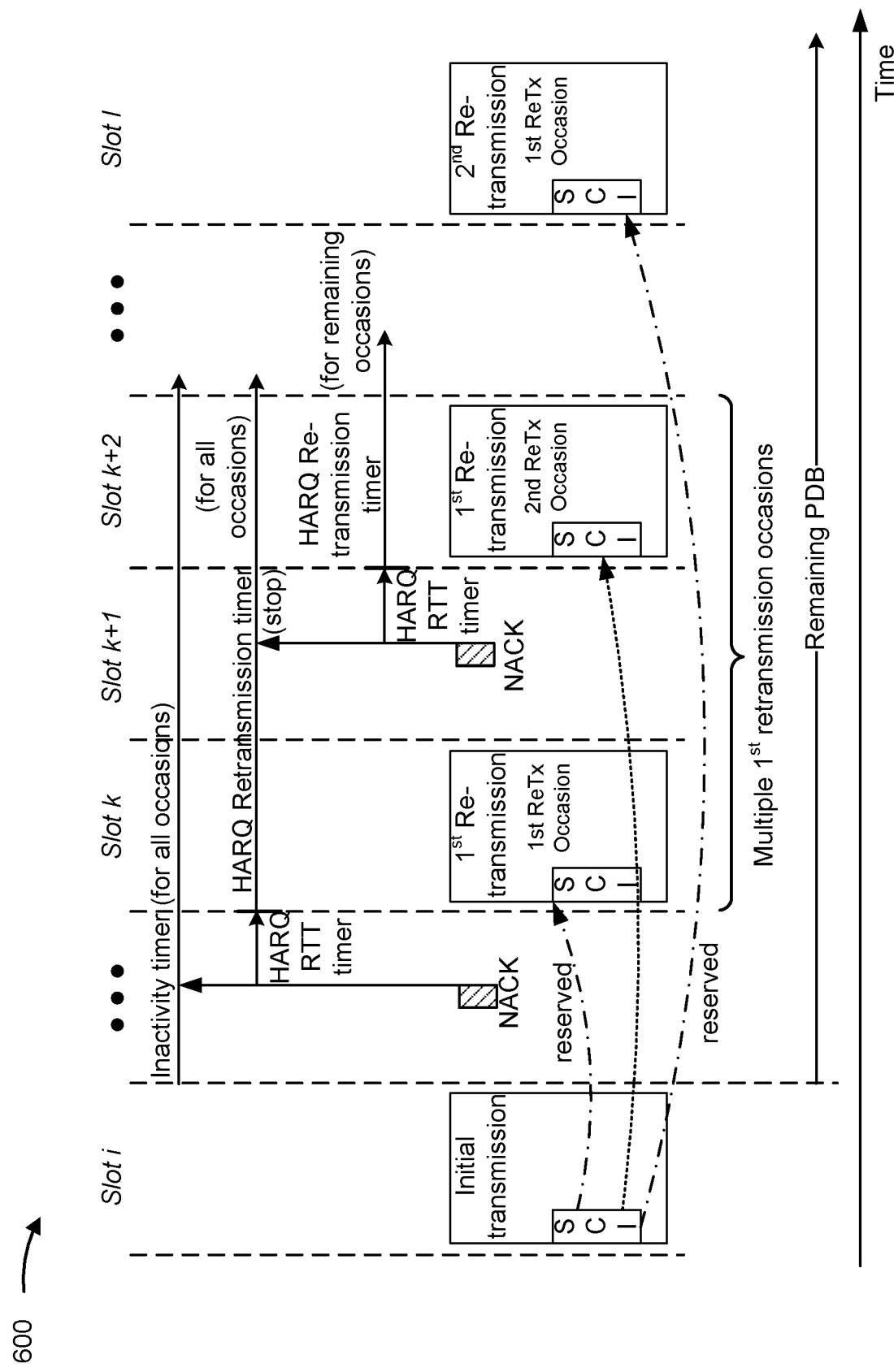

FIG. 6 is a diagram illustrating an example 600 associated with retransmissions over a sidelink unlicensed band, in accordance with the present disclosure.

As shown in FIG. 6, a Tx UE (or first UE) may transmit, to an Rx UE (or second UE), an initial transmission. The Tx UE may transmit SCI (e.g., SCI-1) in slot l, which may be associated with the initial transmission. The SCI may indicate multiple retransmission occasions for a first retransmission and/or a second retransmission.

In some aspects, the SCI may indicate a retransmission occasion space field (e.g., retx_occasion_space=1 for one empty slot or mini-slot between two adjacent occasions for the first retransmission) and a retransmission occasions field (e.g., retx_occasions=2 for two retransmission occasions). A first occasion of the first retransmission may correspond to slot k, a second occasion of the first retransmission may correspond to slot k+n (e.g., n=2 as illustrated in FIG. 6), and the second retransmission may correspond to slot l.

In some aspects, multiple retransmission occasions may be based at least in part on sidelink HARQ feedback occasions, where one or more retransmission occasions may be associated with a HARQ feedback occasion (e.g., one retransmission occasion may be associated with a sidelink HARQ feedback occasion for an ACK/NACK or NACK only based HARQ retransmission as illustrated in FIG. 6). A retransmission occasion space and a quantity of retransmission occasions may be associated with or derived from sidelink HARQ feedback occasions. For example, the first occasion of the first retransmission in slot k may be associated with a first sidelink HARQ feedback occasion, and the second occasion of the first retransmission in slot k+n may be associated with a second sidelink HARQ feedback occasion. The first sidelink HARQ feedback occasion may occur prior to slot k (e.g., a NACK in slot k−1 as illustrated in FIG. 6), and the second sidelink HARQ feedback occasion may occur prior to slot k+n (e.g., a NACK in slot k+1 with n 2 as illustrated in FIG. 6). A retransmission occasion space may correspond to a sidelink HARQ feedback occasion space, and the quantity of retransmission occasions (e.g., two retransmission occasions) may correspond to the quantity of sidelink HARQ feedback occasions based at least in part on the association between one or more retransmission occasions and a sidelink HARQ feedback retransmission occasion.

In some aspects, an inactivity timer may be started after the initial transmission. The inactivity timer may be extended to cover a plurality of retransmission occasions (e.g., all retransmission occasions). For example, a sidelink inactivity timer may be extended at least across multiple occasions in slot k and slot k+n by the Tx UE and a sidelink inactivity timer may be extended at least across multiple occasions in slot k and slot k+n by the Rx UE. In some aspects, a sidelink HARQ RTT timer may be started by the Tx UE after a successful NACK receipt at a sidelink HARQ feedback occasion and a sidelink HARQ RTT timer may be started by the Rx UE after a successful LBT for a NACK transmission at a sidelink HARQ feedback occasion. For example, the HARQ RTT timer may be started after a first NACK associated with the first sidelink HARQ feedback occasion or after a second NACK associated with the second sidelink HARQ feedback occasion. In other words, the HARQ RTT timer may be started after the successful NACK receipt or transmission at a sidelink HARQ feedback occasion (e.g., a NACK prior to slot k or slot k+n). Further, the sidelink inactivity timer or a sidelink HARQ retransmission timer may be stopped or reset when the sidelink HARQ RTT timer starts to run. In some aspects, for an ACK/NACK based HARQ retransmission, the Tx UE may start its sidelink HARQ RTT timer after missing an ACK or NACK at a sidelink HARQ feedback occasion and start its sidelink HARQ retransmission timer after the expiration of its sidelink HARQ RTT timer (e.g., treating no HARQ feedback as a DTX which enables a retransmission) and the Rx UE may keep monitoring transmissions from the Tx UE at the retransmission occasions while its inactivity timer is running.

In some aspects, the sidelink HARQ retransmission timer may be started when the sidelink HARQ RTT timer expires, where the sidelink HARQ retransmission timer may be set to cover remaining multiple retransmission occasions respectively by the Tx UE and Rx UE. For example, the sidelink HARQ retransmission timer may cover a plurality of retransmission occasions (e.g., all retransmission occasions) to keep the Tx UE or Rx UE in active state when the sidelink HARQ retransmission timer is started upon the expiration of the sidelink HARQ RTT timer which is started after the first HARQ feedback occasion. The sidelink HARQ retransmission timer may cover remaining retransmission occasions when the sidelink HARQ retransmission timer is started upon the expiration of the sidelink HARQ RTT timer started running after the second ACK/NACK occasion.

As indicated above, FIG. 6 is provided as an example. Other examples may differ from what is described with regard to FIG. 6.

Figure 7:
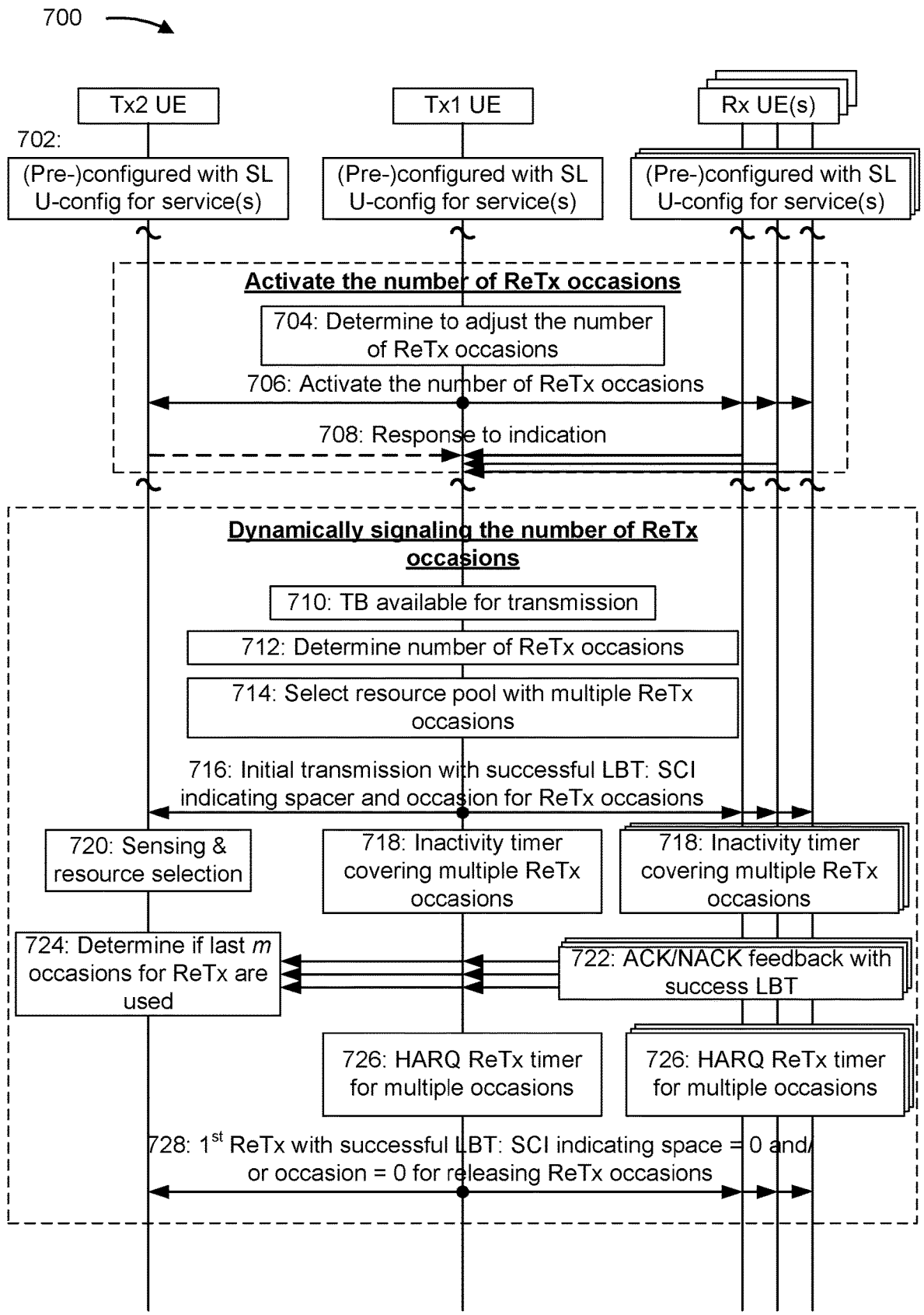

FIG. 7 is a diagram illustrating an example 700 associated with retransmissions over a sidelink unlicensed band, in accordance with the present disclosure. As shown in FIG. 7, example 700 includes communication between a first Tx UE (e.g., UE 120a), an Rx UE (e.g., UE 120e), and a second Tx UE. In some aspects, the first UE, the Rx UE, and the second Tx UE may be included in a wireless network, such as wireless network 100. In some aspects, at least the first Tx UE, the Rx UE, or the second Tx UE may not be included in a wireless network, such as wireless network 100, e.g., out of the coverage of base station 110. The first Tx UE may be a first UE, the Rx UE may be a second UE, and the second Tx UE may be a third UE.

In some aspects, a quantity of retransmission occasions (e.g., multiple retransmission occasions) may be associated with a retransmission reservation, which may provide increased reliability for LBT based retransmissions. The quantity of retransmission occasions may be greater than one. The quantity of retransmission occasions may be pre-configured or configured via RRC signaling from a base station or preconfigured by a manufacture or a service provider via a software management protocol. The quantity of retransmission occasions may be configured via sidelink RRC signaling from a special UE such as a group lead, a cluster head, a RSU as a lead in proximity, a scheduling UE, a Tx UE, etc. The quantity of retransmission occasions may be activated via a sidelink MAC-CE by a special UE. The quantity of retransmission occasions may be dynamically signaled via a SCI (e.g., in SCI-1) by a Tx UE or a scheduling UE.

As shown by reference number 702, the first Tx UE, the Rx UE (or multiple Rx UEs for groupcast or broadcast), and the second Tx UE may be preconfigured with (e.g., as set with a control or management protocol by a telecommunication standard) or configured via a base station with a sidelink unlicensed configuration (e.g., SLU_config) for service(s). The sidelink unlicensed configuration may indicate multiple quantities of retransmission occasions (e.g., retx_occasions), where each quantity of retransmission occasions may be associated with a space in time between adjacent retransmission occasions (e.g., retx_occasion_space). For example, the sidelink unlicensed configuration may indicate a list of different quantities of retransmission occasions and corresponding spaces in time between adjacent transmissions. A quantity of retransmission occasions and a corresponding space in time between adjacent retransmission occasions may be associated with a QoS requirement of a service (e.g., indicated with a QoS profile or one or more QoS parameters for a service), a CBR level, an LBT success rate, and/or an LBT failure rate. Depending on a QoS requirement of a service, a particular quantity of retransmission occasions may be employed. For example, a relatively small quantity of retransmission occasions may be needed for a service with a low priority or a low reliability or a long latency requirement (e.g., the priority is below a threshold pre-configured or configured, or the reliability is below a threshold pre-configured or configured, or the PDB or latency is above a threshold pre-configured or configured), whereas a relatively large quantity of retransmission occasions may be needed for a service with a high priority or a high reliability or a short latency requirement (e.g., the priority is above a threshold pre-configured or configured, or the reliability is above a threshold pre-configured or configured, or the PDB or latency is below a threshold pre-configured or configured). Depending on channel conditions, a particular quantity of retransmission occasions may be employed. For example, a relatively small quantity of retransmission occasions may be needed for favorable channel conditions (e.g., an LBT success rate is above a threshold pre-configured or configured or an LBT failure rate is below a threshold pre-configured or configured), whereas a relatively large quantity of retransmission occasions may be needed for unfavorable channel conditions (e.g., an LBT failure rate is above a threshold pre-configured or configured or an LBT success rate is below a threshold pre-configured or configured). For another example, a relatively small quantity of retransmission occasions may be needed to reduce sidelink channel congestion (e.g., CBR is above a threshold), whereas a relatively large quantity of retransmission occasions may be needed for more available sidelink channel (e.g., CBR is below a threshold).

In some aspects, the first Tx UE may activate (or deactivate) a quantity of retransmission occasions in a semi-persistent manner. As shown by reference number 704, the first Tx UE may determine to adjust the quantity of retransmission occasions. The first Tx UE may determine to adjust the quantity based at least in part on the QoS requirement of a service, the CBR level, the LBT success rate, and/or the LBT failure rate.

As shown by reference number 706, the first Tx UE may reconfigure or activate the quantity of retransmission occasions, where the quantity of retransmission occasions may be one of the options indicated in the list included in the sidelink unlicensed configuration. For example, the quantity of retransmission occasions may be included on the list of different quantities of retransmission occasions and corresponding spaces in time between adjacent transmissions. The first Tx UE may reconfigure or activate the quantity of retransmission occasions and/or corresponding spaces in time between adjacent transmissions for other UEs, such as the Rx UE and the second Tx UE in proximity. The first Tx UE may reconfigure the quantity of retransmission occasions and/or corresponding spaces in time between adjacent transmissions via PC5 RRC reconfiguration message to the other UEs such as Rx UE(s) or the second Tx UE in proximity. The first Tx UE may activate the quantity of retransmission occasions and/or corresponding spaces in time between adjacent transmissions via PC5 MAC-CE indication or via SCI signaling to the other UEs such as Rx UE(s) or the second Tx UE in proximity. The other UEs such as the Rx UE(s) may monitor at the quantity of retransmission occasions configured via PC5 RRC or activated via PC5 MAC CE or signaled via SCI. The other UEs such as the second Tx UE in proximity may exclude the resources, to be used for the quantity of retransmission occasions configured via PC5 RRC or activated via PC5 MAC CE or signaled via SCI, from its candidate resource list for resource sensing and selection for a transmission and/or one or more retransmissions.

As shown by reference number 708, the other UEs such as the Rx UE and the second Tx UE may transmit a confirmation to the first Tx UE, where the confirmation may be in response to the first Tx UE PC5 RRC reconfiguring or PC5 MAC CE activating the quantity of retransmission occasions and/or corresponding spaces in time between adjacent transmissions. The other UEs may transmit the PC5 RRC confirmation to the PC5 RRC reconfiguring or via an ACK to the MAC CE activating.

In some aspects, the first Tx UE may dynamically signal the quantity of retransmission occasions (e.g., retx_occasions) and/or corresponding spaces in time (e.g., retx_occasion_space) between adjacent transmissions. As shown by reference number 710, the first Tx UE may determine that a transport block is available for transmission. As shown by reference number 712, the first Tx UE may determine the quantity of retransmission occasions and/or corresponding spaces in time between adjacent transmissions based at least in part on a priority, reliability, and/or PDB or remaining PDB of the transport block. In some cases, the quantity of retransmission occasions and/or corresponding spaces in time between adjacent transmissions determined by the first Tx UE may be included on the list of different quantities of retransmission occasions and corresponding spaces in time between adjacent transmissions, as indicated by the sidelink unlicensed configuration. In some cases, the quantity of retransmission occasions and/or corresponding spaces in time between adjacent transmissions determined by the first Tx UE may not be included on the list of different quantities of retransmission occasions and corresponding spaces in time between adjacent transmissions, as indicated by the sidelink unlicensed configuration. As shown by reference number 714, the first Tx UE may select a resource pool with multiple HARQ feedback if enabled and retransmission occasions meeting a remaining PDB requirement. The first Tx UE may select the resource pool having the quantity of retransmission occasions and/or corresponding spaces in time between adjacent transmissions based at least in part on the priority, reliability, and/or remaining PDB of the transport block, or based at least in part on a CBR or an LBT success rate, and/or an LBT failure rate.

As shown by reference number 716, the first Tx UE may perform an LBT on a slot or a mini-slot within a slot, and based at least in part on a successful LBT, the first Tx UE may perform an initial transmission of the transport block. The first Tx UE may transmit the initial transmission of the transport block with an SCI (e.g., SCI-1), which may be received by the Rx UE and the second Tx UE in proximity.

In some aspects, when the quantity of retransmission occasions and/or corresponding spaces in time between adjacent transmissions is dynamically signaled based on a resource selection with a select resource pool, the first Tx UE may transmit SCI (e.g., SCI-1) along with the initial transmission of the transport block. In other words, the SCI may be associated with the initial transmission of the transport block. The SCI (e.g., SCI-1) may indicate the quantity of retransmission occasions and/or the space in time between adjacent transmissions. In some aspects, the quantity of retransmission occasions and/or the space in time between adjacent transmissions may be indicated only in the SCI transmitted with the initial transmission of a transport block and may be applied for all the retransmissions of the transport block, for example, based at least in part on a QoS parameter of the transport block or resource selection with a selected resource pool. In some aspects, the quantity of retransmission occasions and/or the space in time between adjacent transmissions may be indicated in each SCI transmitted with the initial transmission and retransmission(s) of a transport block and may be applied for the immediate next retransmissions of the transport block, for example, based in part on at least a CBR or an LBT success rate or an LBT failure rate or resource selection or reselection with a selected resource pool.

As shown by reference number 718, the first Tx UE or the Rx UE(s) may start an inactivity timer covering the quantity of retransmission occasions (e.g., multiple retransmission occasions) after transmitting or receiving, respectively, the SCI with the initial transmission of the transport block (e.g., after slot 1). As shown by reference number 720, the second Tx UE may perform a resource sensing and selecting, and the second Tx UE may receive the SCI (e.g., SCI-1) from the first Tx UE based at least in part on the resource sensing. The second Tx UE may perform a resource selection excluding one or more resources to be used for the quantity of retransmission occasions based at least in part on the received SCI indicating the quantity of retransmission occasions and the space in time between adjacent transmissions. For example, the first one or more of the quantity of retransmission occasions may be excluded (e.g., not selected by the second Tx UE for its initial transmission and/or retransmission(s)) based in part at least on the comparison of one or more QoS parameters (e.g., priority, reliability, PDB or remaining PDB for latency, etc.) between the first Tx UE's transport block and the second TX UE's transport block or a CBR level or an LBT success rate or an LBT failure rate. For another example, none of the quantity of retransmission occasions may be excluded (e.g., selected by the second Tx UE for its initial transmission and/or retransmission(s)) based in part on at least the sidelink RSRP measurement on the initial transmission from the first Tx UE (e.g., RSRP measurement on the PSCCH or PSSCH of the initial transmission is below the threshold pre-configured or configured) or the highest priority or short PDB or remaining PDB of the transport block to be transmitting by the second Tx UE.

As shown by reference number 722, the Rx UE may perform an LBT for transmitting sidelink HARQ ACK/NACK or NACK only feedback to the first Tx UE. After a successful LBT, the Rx UE may transmit the sidelink HARQ ACK/NACK or NACK only feedback, which may be received at the first Tx UE and the second Tx UE in proximity. The Rx UE or the first Tx UE may start a sidelink HARQ RTT timer after transmitting or receiving, respectively, a NACK in response to the initial transmission of the transport block. In other words, the HARQ feedback transmitted by the Rx UE may indicate the NACK. The NACK may indicate that the initial transmission of the transport block was not successfully received at the Rx UE. In some aspects, for an ACK/NACK based HARQ retransmission, the Tx UE may start its sidelink HARQ RTT timer after missing an ACK or NACK at a sidelink HARQ feedback occasion and start its sidelink HARQ retransmission timer after the expiration of its sidelink HARQ RTT timer (e.g., treating no HARQ feedback as a DTX which enables a retransmission) and the Rx UE may keep monitoring transmissions from the Tx UE at the retransmission occasions while its inactivity timer is running. The inactivity timer may be stopped by the Rx UE after transmitting an ACK HARQ feedback after a successful LBT at a sidelink HARQ feedback occasion. The inactivity timer may be stopped by the first Tx UE after receiving an ACK HARQ feedback at a sidelink HARQ feedback occasion. As shown by reference number 724, the second Tx UE may determine whether a last quantity of retransmission occasions (e.g., a last m retransmission occasions) may be used based at least in part on a remaining quantity of retransmission occasions. The second Tx UE may determine whether the last quantity of retransmission occasions may be used based at least in part on the HARQ ACK/NACK feedback (e.g., if more retransmissions are needed or not), the priority, the CBR level, the LBT success rate, and/or the LBT failure rate.

As shown by reference number 726, the Rx UE and the Tx UE may start a HARQ retransmission timer covering the quantity of retransmission occasions based at least in part on an expiry of the HARQ RTT timer which is started after transmitting or receiving a sidelink HARQ feedback at a sidelink HARQ feedback occasion. For example, the Rx UE and the Tx UE may start the HARQ retransmission timer covering the quantity of retransmission occasions when the HARQ RTT timer expires. As shown by reference number 728, the first Tx UE may perform an LBT on a slot or mini-slot for a retransmission of the transport block, where the transport block may be retransmitted based at least in part on the NACK. The first Tx UE may perform the retransmission of the transport block based at least in part on a successful LBT. The first Tx UE may transmit SCI along with the retransmission of the transport block. The SCI may indicate a quantity of retransmission occasions set to "0", which may release remaining retransmission occasions for a first retransmission of the transport block. The Rx UE may monitor a channel for the retransmission of the transport block while the HARQ retransmission timer is running. The Rx UE may successfully receive the retransmission of the transport block.

As indicated above, FIG. 7 is provided as an example. Other examples may differ from what is described with regard to FIG. 7.

Figure 8:
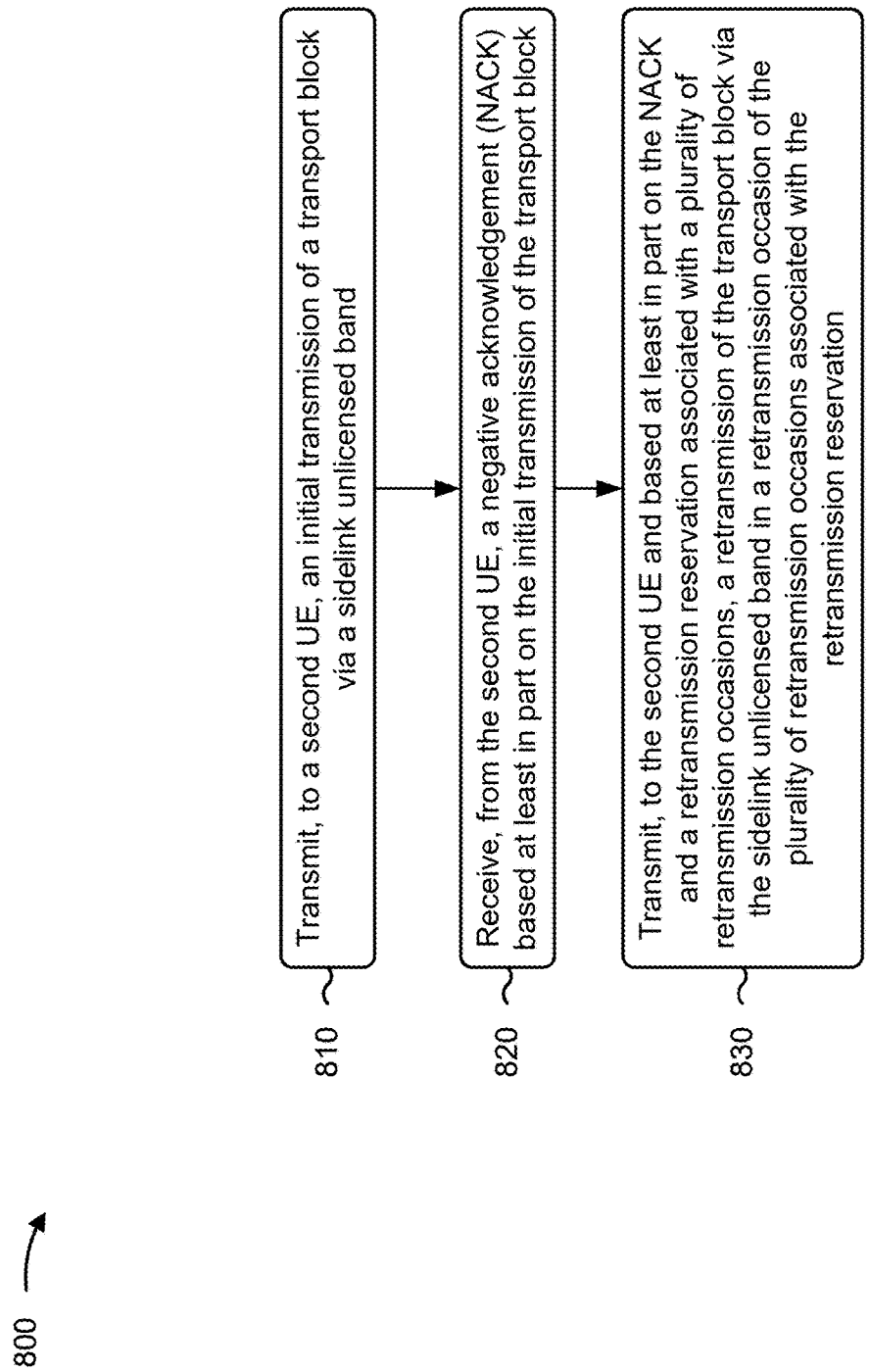
FIGS. 8-9 are diagrams illustrating example processes associated with retransmissions over a sidelink unlicensed band, in accordance with the present disclosure.

FIG. 8 is a diagram illustrating an example process 800 performed, for example, by a first UE, in accordance with the present disclosure. Example process 800 is an example where the first UE (e.g., UE 120*a*) performs operations associated with retransmissions over a sidelink unlicensed band.

As shown in FIG. 8, in some aspects, process 800 may include transmitting, to a second UE, an initial transmission of a transport block via a sidelink unlicensed band (block 810). For example, the UE (e.g., using communication manager 140 and/or transmission component 1004, depicted in FIG. 10) may transmit, to a second UE, an initial transmission of a transport block via a sidelink unlicensed band, as described above.

As further shown in FIG. 8, in some aspects, process 800 may include receiving, from the second UE, a NACK based at least in part on the initial transmission of the transport block (block 820). For example, the UE (e.g., using communication manager 140 and/or reception component 1002, depicted in FIG. 10) may receive, from the second UE, a NACK based at least in part on the initial transmission of the transport block, as described above.

As further shown in FIG. 8, in some aspects, process 800 may include transmitting, to the second UE and based at least in part on the NACK and a retransmission reservation, a retransmission of the transport block via the sidelink unlicensed band in a retransmission occasion of a plurality of retransmission occasions associated with the retransmission reservation (block 830). For example, the UE (e.g., using communication manager 140 and/or transmission component 1004, depicted in FIG. 10) may transmit, to the second UE and based at least in part on the NACK and a retransmission reservation, a retransmission of the transport block via the sidelink unlicensed band in a retransmission occasion of a plurality of retransmission occasions associated with the retransmission reservation, as described above.

Process 800 may include additional aspects, such as any single aspect or any combination of aspects described below and/or in connection with one or more other processes described elsewhere herein.

In a first aspect, each retransmission of the transport block is associated with a respective retransmission reservation that includes the plurality of retransmission occasions, and the retransmission reservation is indicated in SCI transmitted with the initial transmission or with a previous retransmission.

In a second aspect, alone or in combination with the first aspect, process 800 includes receiving a sidelink unlicensed configuration that indicates a plurality of different quantities of retransmission occasions, wherein each quantity of retransmission occasions is associated with one or more of QoS profiles or parameters of services, CBR levels, LBT failure rates, or LBT success rates; and selecting a quantity for the plurality of retransmission occasions, from among the different quantities of retransmission occasions indicated in the sidelink unlicensed configuration, based at least in part on one or more of a QoS profile or parameter of the service associated with the transport block, a CBR level measured by the first UE or reported by the second UE or a combination of both, an LBT failure rate or an LBT success rate measured by the first UE or reported by the second UE or a combination of both.

In a third aspect, alone or in combination with one or more of the first and second aspects, the sidelink unlicensed configuration indicates the plurality of different quantities of retransmission occasions and corresponding spaces between adjacent retransmission occasions.

In a fourth aspect, alone or in combination with one or more of the first through third aspects, process 800 includes transmitting, to the second UE, a reconfiguration via RRC signaling or an activation via a MAC-CE that indicates a quantity of the plurality of retransmission occasions, the quantity of the plurality of retransmission occasions being based at least in part on one or more of a QoS profile or parameter of a service, a CBR level, an LBT failure rate, or an LBT success rate; and receiving a confirmation from the second UE based at least in part on the reconfiguration via the RRC signaling or the activation via the MAC-CE.

In a fifth aspect, alone or in combination with one or more of the first through fourth aspects, process 800 includes transmitting the initial transmission of the transport block in a slot or in a mini-slot based at least in part on a successful LBT in the slot or in the mini-slot, and transmitting the retransmission of the transport block based at least in part on a successful LBT in a slot or in a mini-slot associated with the retransmission occasion for the retransmission of the transport block.

In a sixth aspect, alone or in combination with one or more of the first through fifth aspects, process 800 includes determining that the transport block is available for transmission; determining a quantity of the plurality of retransmission occasions based at least in part on a QoS profile or parameters associated to the transport block, including one or more of a priority of the transport block, a reliability associated with the transport block, a remaining PDB, a CBR level, an LBT failure rate, or an LBT success rate; and selecting a resource pool with the quantity of the retransmission occasions that satisfies a remaining PDB constraint, the plurality of retransmission occasions being based at least in part on the resource pool and the quantity of the retransmission occasions.

In a seventh aspect, alone or in combination with one or more of the first through sixth aspects, process 800 includes transmitting SCI associated with the initial transmission of the transport block, wherein the SCI indicates a quantity of the plurality of retransmission occasions, and transmitting the retransmission of the transport block in the retransmission occasion is based at least in part on the SCI that indicates the quantity of the plurality of retransmission occasions.

In an eighth aspect, alone or in combination with one or more of the first through seventh aspects, the SCI indicates the quantity of the plurality of retransmission occasions and a space in time between adjacent retransmission occasions.

In a ninth aspect, alone or in combination with one or more of the first through eighth aspects, process 800 includes starting a sidelink inactivity timer having a length based at least in part on a time duration of the plurality of retransmission occasions based at least in part on transmitting the SCI with the initial transmission of the transport block, starting a sidelink HARQ RTT timer based at least in part on receiving the NACK from the second UE, starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block, and stopping the sidelink inactivity timer at an end of the plurality of retransmission occasions.

In a tenth aspect, alone or in combination with one or more of the first through ninth aspects, process 800 includes transmitting SCI associated with the retransmission of the transport block, wherein the SCI indicates a quantity of retransmission occasions that releases remaining retransmission occasions for the retransmission of the transport block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
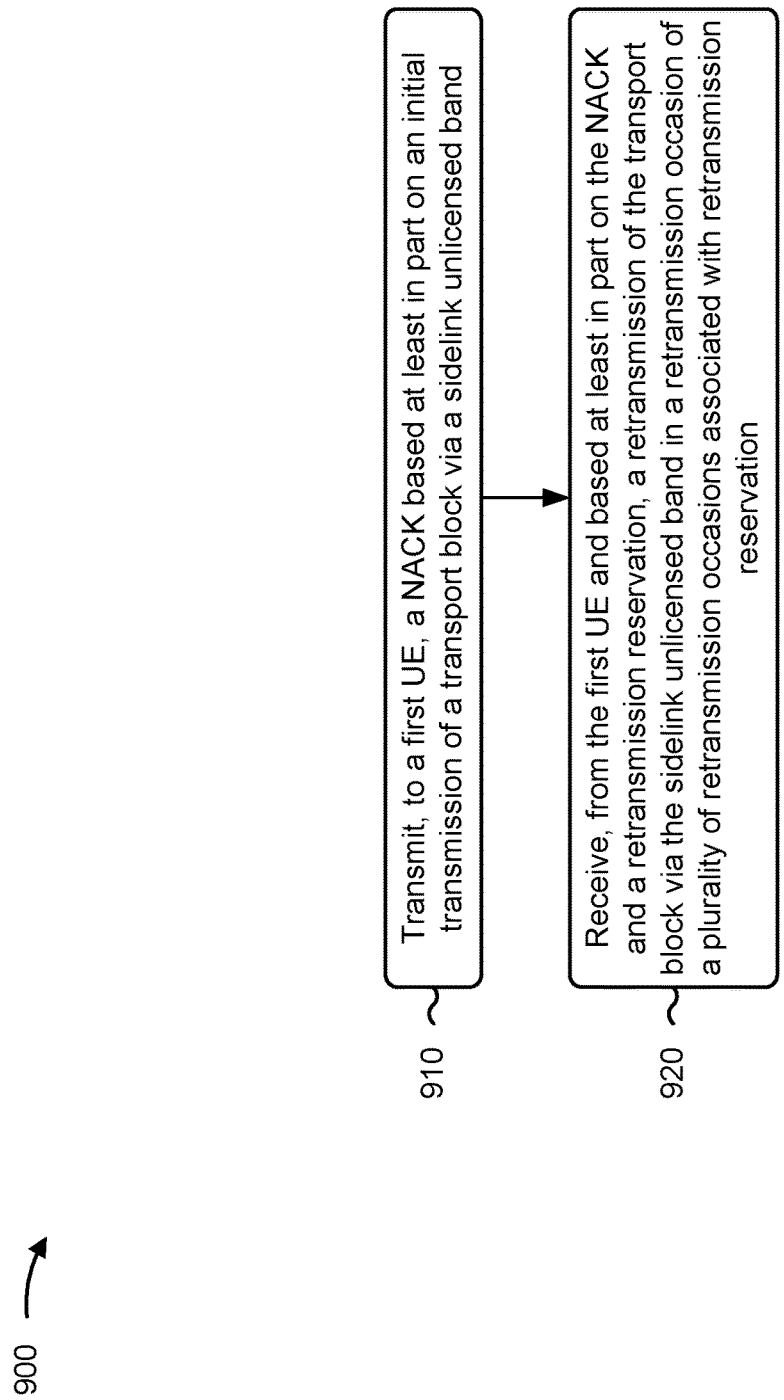

FIG. 9 is a diagram illustrating an example process 900 performed, for example, by a second UE, in accordance with the present disclosure. Example process 900 is an example where the second UE (e.g., UE 120*e*) performs operations associated with retransmissions over a sidelink unlicensed band.

As shown in FIG. 9, in some aspects, process 900 may include transmitting, to a first UE, a NACK based at least in part on an initial transmission of a transport block via a sidelink unlicensed band (block 910). For example, the UE (e.g., using communication manager 150 and/or transmission component 1104, depicted in FIG. 11) may transmit, to a first UE, a NACK based at least in part on an initial transmission of a transport block via a sidelink unlicensed band, as described above.

As further shown in FIG. 9, in some aspects, process 900 may include receiving, from the first UE and based at least in part on the NACK and a retransmission reservation, a retransmission of the transport block via the sidelink unlicensed band in a retransmission occasion of a plurality of retransmission occasions associated with retransmission reservation (block 920). For example, the UE (e.g., using communication manager 150 and/or reception component 1102, depicted in FIG. 11) may receive, from the first UE and based at least in part on the NACK and a retransmission reservation, a retransmission of the transport block via the sidelink unlicensed band in a retransmission occasion of a plurality of retransmission occasions associated with retransmission reservation, as described above.

Process 900 may include additional aspects, such as any single aspect or any combination of aspects described below and/or in connection with one or more other processes described elsewhere herein.

In a first aspect, each retransmission of the transport block is associated with a respective retransmission reservation that includes the plurality of retransmission occasions, and the retransmission reservation is received in SCI received with the initial transmission or with a previous retransmission.

In a second aspect, alone or in combination with the first aspect, process 900 includes receiving a sidelink unlicensed configuration that indicates a plurality of different quantities of retransmission occasions, wherein each quantity of retransmission occasions is associated with one or more of QoS profiles or parameters of services, CBR levels, LBT failure rates, or LBT success rates.

In a third aspect, alone or in combination with one or more of the first and second aspects, process 900 includes receiving, from the first UE, a reconfiguration via RRC signaling or an activation via a MAC-CE that indicates a quantity of the plurality of retransmission occasions, the quantity of the plurality of retransmission occasions being based at least in part on one or more of a QoS profile or parameter of a service, a CBR level, an LBT failure rate, or an LBT success rate; and transmitting, to the first UE, a confirmation based at least in part on the reconfiguration via the RRC signaling or the activation via the MAC-CE.

In a fourth aspect, alone or in combination with one or more of the first through third aspects, transmitting the NACK is based at least in part on a successful LBT in a slot or in a mini-slot associated with the NACK.

In a fifth aspect, alone or in combination with one or more of the first through fourth aspects, process 900 includes receiving SCI associated with the initial transmission of the transport block, wherein the SCI indicates a quantity of the plurality of retransmission occasions; and receiving the retransmission of the transport block in the retransmission occasion is based at least in part on the SCI that indicates the quantity of the plurality of retransmission occasions.

In a sixth aspect, alone or in combination with one or more of the first through fifth aspects, process 900 includes starting a sidelink inactivity timer having a length based at least in part on a time duration of the plurality of retransmission occasions based at least in part on transmitting the SCI with the initial transmission of the transport block, starting a sidelink HARQ RTT timer based at least in part on receiving the NACK from the second UE, starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block, and stopping the sidelink inactivity timer at an end of the plurality of retransmission occasions.

In a seventh aspect, alone or in combination with one or more of the first through sixth aspects, process 900 includes monitoring for the retransmission of the transport block while the sidelink HARQ retransmission timer is running, and receiving SCI associated with the retransmission of the transport block, wherein the SCI indicates a quantity of retransmission occasions that releases remaining retransmission occasions for the retransmission of the transport block.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
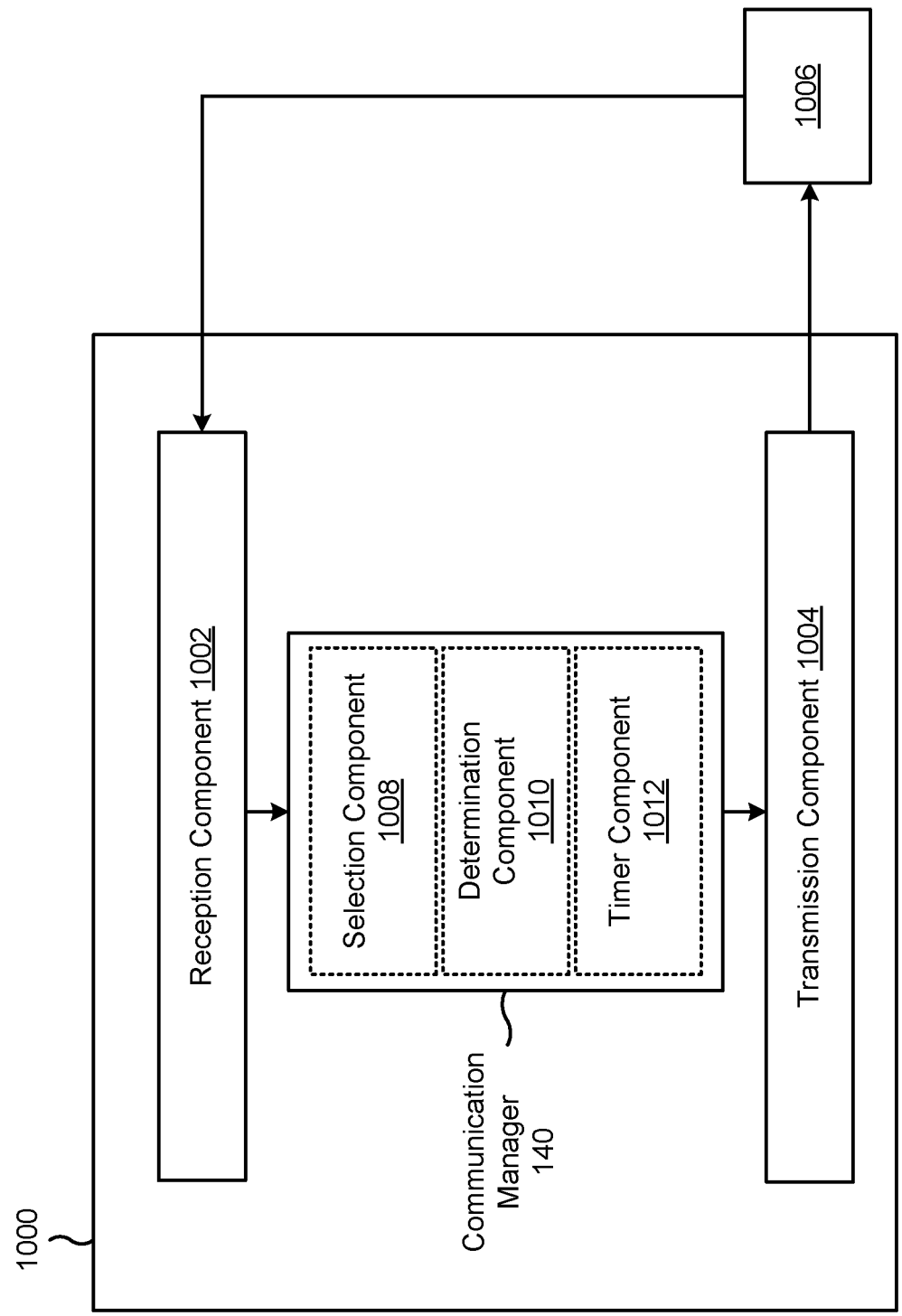
FIGS. 10-11 are diagrams of example apparatuses for wireless communication, in accordance with the present disclosure.

FIG. 10 is a diagram of an example apparatus 1000 for wireless communication. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a selection component 1008, a determination component 1010, or a timer component 1012, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The transmission component 1004 may transmit, to a second UE, an initial transmission of a transport block via a sidelink unlicensed band. The reception component 1002 may receive, from the second UE, a NACK based at least in part on the initial transmission of the transport block. The transmission component 1004 may transmit, to the second UE and based at least in part on the NACK and a retransmission reservation, a retransmission of the transport block via the sidelink unlicensed band in a retransmission occasion of a plurality of retransmission occasions associated with the retransmission reservation.

The reception component 1002 may receive a sidelink unlicensed configuration that indicates a plurality of different quantities of retransmission occasions, wherein each quantity of retransmission occasions is associated with one or more of QoS profiles or parameters of services, CBR levels, LBT failure rates, or LBT success rates. The selection component 1008 may select a quantity for the plurality of retransmission occasions, from among the different quantities of retransmission occasions indicated in the sidelink unlicensed configuration, based at least in part on one or more of: a QoS profile or parameter of the service associated with the transport block, a CBR level measured by the first UE or reported by the second UE or a combination of both, an LBT failure rate or an LBT success rate measured by the first UE or reported by the second UE or a combination of both.

The transmission component 1004 may transmit, to the second UE, a reconfiguration via RRC signaling or an activation via a MAC-CE that indicates a quantity of the plurality of retransmission occasions. The quantity of the plurality of retransmission occasions may be based at least in part on one or more of a QoS profile or parameter of a service, a channel busy ratio level, an LBT failure rate, or an LBT success rate. The reception component 1002 may receive a confirmation from the second UE based at least in part on the reconfiguration via the RRC signaling or the activation via the MAC-CE.

The transmission component 1004 may transmit the initial transmission of the transport block in a slot or in a mini-slot based at least in part on a successful LBT in the slot or in the mini-slot. The transmission component 1004 may transmit the retransmission of the transport block based at least in part on a successful LBT in a slot or in a mini-slot associated with the retransmission occasion for the retransmission of the transport block.

The determination component 1010 may determine that the transport block is available for transmission. The determination component 1010 may determine a quantity of the plurality of retransmission occasions based at least in part on a QoS profile or parameters associated to the transport block, including one or more of: a priority of the transport block, a reliability associated with the transport block, a remaining PDB, a CBR level, an LBT failure rate, or an LBT success rate. The selection component 1008 may select a resource pool with the quantity of the retransmission occasions that satisfies a remaining PDB constraint the plurality of retransmission occasions being based at least in part on the resource pool and the quantity of the retransmission occasions.

The transmission component 1004 may transmit SCI associated with the initial transmission of the transport block, wherein the SCI indicates a quantity of the plurality of retransmission occasions. The transmission component 1004 may transmit the retransmission of the transport block in the retransmission occasion based at least in part on the SCI that indicates the quantity of the plurality of retransmission occasions.

The timer component 1012 may start a sidelink inactivity timer having a length based at least in part on a time duration of the plurality of retransmission occasions based at least in part on transmitting the SCI with the initial transmission of the transport block. The timer component 1012 may start a sidelink HARQ RTT timer based at least in part on receiving the NACK from the second UE. The timer component 1012 may start a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block. The timer component 1012 may stop the sidelink inactivity timer at an end of the plurality of retransmission occasions.

The transmission component 1004 may transmit SCI associated with the retransmission of the transport block, wherein the SCI indicates a quantity of retransmission occasions that releases remaining retransmission occasions for the retransmission of the transport block.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
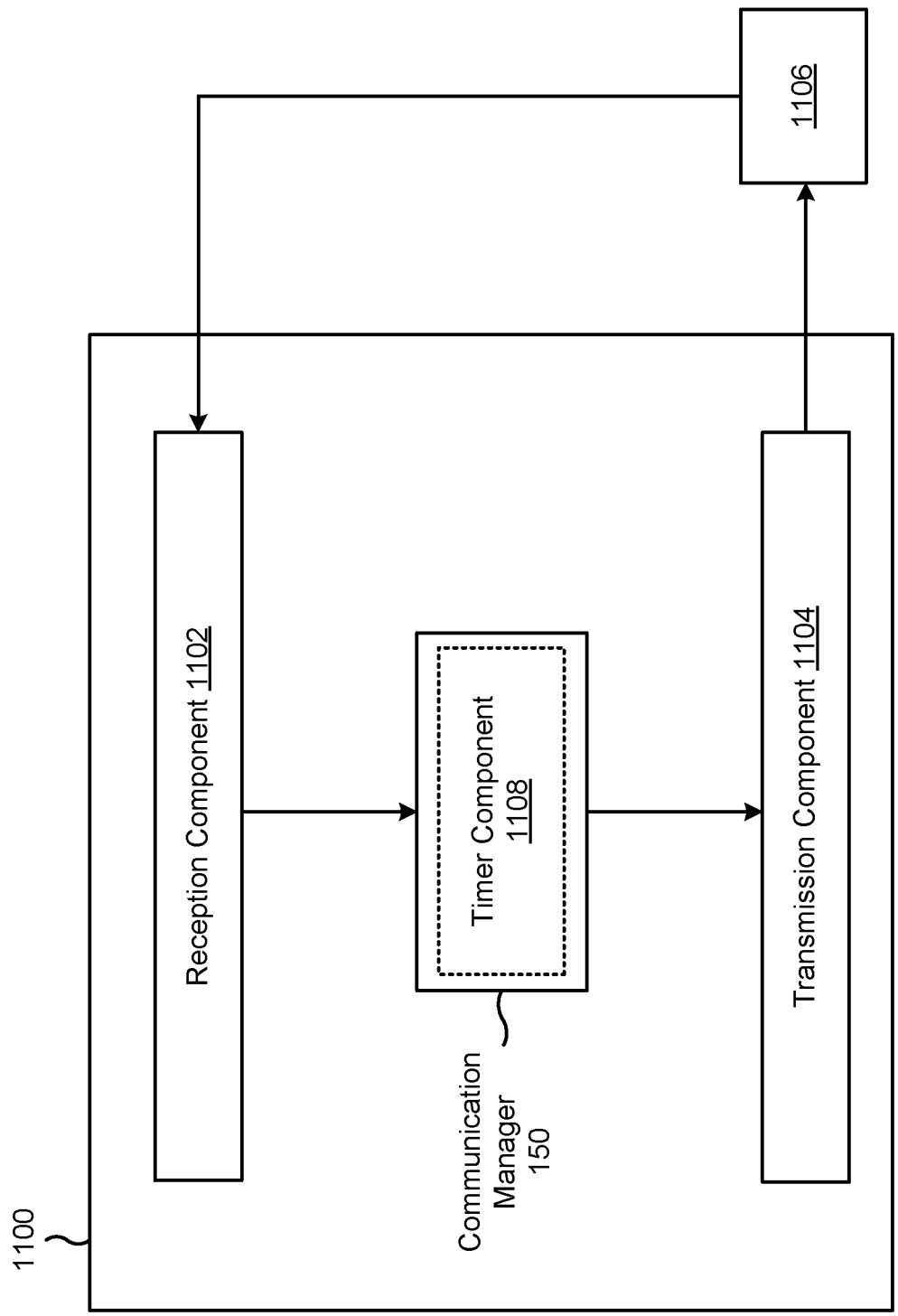

FIG. 11 is a diagram of an example apparatus 1100 for wireless communication. The apparatus 1100 may be a second UE, or a second UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a timer component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second UE described in connection with FIG. 2. In some aspects, the transmission component 1104 may be co-located with the reception component 1102 in a transceiver.

The transmission component 1104 may transmit, to a first UE, a NACK based at least in part on an initial transmission of a transport block via a sidelink unlicensed band. The reception component 1102 may receive, from the first UE and based at least in part on the NACK and a retransmission reservation, a retransmission of the transport block via the sidelink unlicensed band in a retransmission occasion of a plurality of retransmission occasions associated with retransmission reservation.

The reception component 1102 may receive a sidelink unlicensed configuration that indicates a plurality of different quantities of retransmission occasions, wherein each quantity of retransmission occasions is associated with one or more of QoS profiles or parameters of services, CBR levels, LBT failure rates, or LBT success rates. The reception component 1102 may receive, from the first UE, a reconfiguration via RRC signaling or an activation via a MAC-CE that indicates a quantity of the plurality of retransmission occasions the quantity of the plurality of retransmission occasions being based at least in part on one or more of a QoS profile or parameter of a service, a CBR level, an LBT failure rate, or an LBT success rate. The transmission component 1104 may transmit, to the first UE, a confirmation based at least in part on the reconfiguration via the RRC signaling or the activation via the MAC-CE.

The transmission component 1104 may transmit the NACK is based at least in part on a successful LBT in a slot or in a mini-slot associated with the NACK. The reception component 1102 may receive SCI associated with the initial transmission of the transport block, wherein the SCI indicates a quantity of the plurality of retransmission occasions. The reception component 1102 may receive the retransmission of the transport block in the retransmission occasion based at least in part on the SCI that indicates the quantity of the plurality of retransmission occasions.

The timer component 1108 may start a sidelink inactivity timer having a length based at least in part on a time duration of the plurality of retransmission occasions based at least in part on transmitting the SCI with the initial transmission of the transport block. The timer component 1108 may start a sidelink HARQ RTT timer based at least in part on receiving the NACK from the second UE. The timer component 1108 may start a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block. The timer component 1108 may stop the sidelink inactivity timer at an end of the plurality of retransmission occasions.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: transmitting, to a second UE, an initial transmission of a transport block via a sidelink unlicensed band; receiving, from the second UE, a negative acknowledgement (NACK) based at least in part on the initial transmission of the transport block; and transmitting, to the second UE and based at least in part on the NACK and a retransmission reservation, a retransmission of the transport block via the sidelink unlicensed band in a retransmission occasion of a plurality of retransmission occasions associated with the retransmission reservation.

Aspect 2: The method of Aspect 1, wherein each retransmission of the transport block is associated with a respective retransmission reservation that includes the plurality of retransmission occasions, and wherein the retransmission reservation is indicated in sidelink control information transmitted with the initial transmission or with a previous retransmission.

Aspect 3: The method of any of Aspects 1 through 2, further comprising: receiving a sidelink unlicensed configuration that indicates a plurality of different quantities of retransmission occasions, wherein each quantity of retransmission occasions is associated with one or more of quality of service (QoS) profiles or parameters of services, channel busy ratio (CBR) levels, listen before talk (LBT) failure rates, or LBT success rates; and selecting a quantity for the plurality of retransmission occasions, from among the different quantities of retransmission occasions indicated in the sidelink unlicensed configuration, based at least in part on one or more of: a QoS profile or parameter of the service associated with the transport block, a CBR level measured by the first UE or reported by the second UE or a combination of both, an LBT failure rate or an LBT success rate measured by the first UE or reported by the second UE or a combination of both.

Aspect 4: The method of Aspect 3, wherein the sidelink unlicensed configuration indicates the plurality of different quantities of retransmission occasions and corresponding spaces between adjacent retransmission occasions.

Aspect 5: The method of any of Aspects 1 through 4, further comprising: transmitting, to the second UE, a reconfiguration via radio resource control (RRC) signaling or an activation via a medium access control control element (MAC-CE) that indicates a quantity of the plurality of retransmission occasions, the quantity of the plurality of retransmission occasions being based at least in part on one or more of a quality of service (QoS) profile or parameter of a service, a channel busy ratio level, a listen before talk (LBT) failure rate, or an LBT success rate; and receiving a confirmation from the second UE based at least in part on the reconfiguration via the RRC signaling or the activation via the MAC-CE.

Aspect 6: The method of any of Aspects 1 through 5, wherein: transmitting the initial transmission of the transport block in a slot or in a mini-slot based at least in part on a successful listen before talk (LBT) in the slot or in the mini-slot; and transmitting the retransmission of the transport block based at least in part on a successful LBT in a slot or in a mini-slot associated with the retransmission occasion for the retransmission of the transport block.

Aspect 7: The method of any of Aspects 1 through 6, further comprising: determining that the transport block is available for transmission; determining a quantity of the plurality of retransmission occasions based at least in part on a quality of service (QoS) profile or parameters associated to the transport block, including one or more of: a priority of the transport block, a reliability associated with the transport block, a remaining packet delay budget (PDB), a channel busy ratio level, a listen before talk (LBT) failure rate, or an LBT success rate; and selecting a resource pool with the quantity of the retransmission occasions that satisfies a remaining PDB constraint, the plurality of retransmission occasions being based at least in part on the resource pool and the quantity of the retransmission occasions.

Aspect 8: The method of any of Aspects 1 through 7, wherein: transmitting the initial transmission of the transport block comprises transmitting sidelink control information (SCI) associated with the initial transmission of the transport block, wherein the SCI indicates a quantity of the plurality of retransmission occasions; and transmitting the retransmission of the transport block in the retransmission occasion is based at least in part on the SCI that indicates the quantity of the plurality of retransmission occasions.

Aspect 9: The method of Aspect 8, wherein the SCI indicates the quantity of the plurality of retransmission occasions and a space in time between adjacent retransmission occasions.

Aspect 10: The method of Aspect 8, further comprising: starting a sidelink inactivity timer having a length based at least in part on a time duration of the plurality of retransmission occasions based at least in part on transmitting the SCI with the initial transmission of the transport block; starting a sidelink hybrid automatic repeat request (HARQ) round-trip time (RTT) timer based at least in part on receiving the NACK from the second UE; starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and stopping the sidelink inactivity timer at an end of the plurality of retransmission occasions.

Aspect 11: The method of any of Aspects 1 through 10, wherein: transmitting the retransmission of the transport block comprises transmitting sidelink control information (SCI) associated with the retransmission of the transport block, wherein the SCI indicates a quantity of retransmission occasions that releases remaining retransmission occasions for the retransmission of the transport block.

Aspect 12: A method of wireless communication performed by a second user equipment (UE), comprising: transmitting, to a first UE, a negative acknowledgement (NACK) based at least in part on an initial transmission of a transport block via a sidelink unlicensed band; and receiving, from the first UE and based at least in part on the NACK and a retransmission reservation, a retransmission of the transport block via the sidelink unlicensed band in a retransmission occasion of a plurality of retransmission occasions associated with retransmission reservation.

Aspect 13: The method of Aspect 12, wherein each retransmission of the transport block is associated with a respective retransmission reservation that includes the plurality of retransmission occasions, and wherein the retransmission reservation is received in sidelink control information received with the initial transmission or with a previous retransmission.

Aspect 14: The method of any of Aspects 12 through 13, further comprising: receiving a sidelink unlicensed configuration that indicates a plurality of different quantities of retransmission occasions, wherein each quantity of retransmission occasions is associated with one or more of quality of service (QoS) profiles or parameters of services, channel busy ratio (CBR) levels, listen before talk (LBT) failure rates, or LBT success rates.

Aspect 15: The method of any of Aspects 12 through 14, further comprising: receiving, from the first UE, a reconfiguration via radio resource control (RRC) signaling or an activation via a medium access control control element (MAC-CE) that indicates a quantity of the plurality of retransmission occasions, the quantity of the plurality of retransmission occasions being based at least in part on one or more of a quality of service (QoS) profile or parameter of a service, a channel busy ratio level, a listen before talk (LBT) failure rate, or an LBT success rate; and transmitting, to the first UE, a confirmation based at least in part on the reconfiguration via the RRC signaling or the activation via the MAC-CE.

Aspect 16: The method of any of Aspects 12 through 15, wherein: transmitting the NACK is based at least in part on a successful listen before talk (LBT) in a slot or in a mini-slot associated with the NACK.

Aspect 17: The method of any of Aspects 12 through 16, wherein: receiving the initial transmission of the transport block comprises receiving sidelink control information (SCI) associated with the initial transmission of the transport block, wherein the SCI indicates a quantity of the plurality of retransmission occasions; and receiving the retransmission of the transport block in the retransmission occasion is based at least in part on the SCI that indicates the quantity of the plurality of retransmission occasions.

Aspect 18: The method of Aspect 17, further comprising: starting a sidelink inactivity timer having a length based at least in part on a time duration of the plurality of retransmission occasions based at least in part on transmitting the SCI with the initial transmission of the transport block; starting a sidelink hybrid automatic repeat request (HARQ) round-trip time (RTT) timer based at least in part on receiving the NACK from the second UE; starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and stopping the sidelink inactivity timer at an end of the plurality of retransmission occasions.

Aspect 19: The method of Aspect 18, wherein receiving the retransmission of the transport block comprises: monitoring for the retransmission of the transport block while the sidelink HARQ retransmission timer is running; and receiving sidelink control information (SCI) associated with the retransmission of the transport block, wherein the SCI indicates a quantity of retransmission occasions that releases remaining retransmission occasions for the retransmission of the transport block.

Aspect 20: An apparatus for wireless communication at a device, comprising a processor; memory coupled with the processor; and instructions stored in the memory and executable by the processor to cause the apparatus to perform the method of one or more of Aspects 1-11.

Aspect 21: A device for wireless communication, comprising a memory and one or more processors coupled to the memory, the one or more processors configured to perform the method of one or more of Aspects 1-11.

Aspect 22: An apparatus for wireless communication, comprising at least one means for performing the method of one or more of Aspects 1-11.

Aspect 23: A non-transitory computer-readable medium storing code for wireless communication, the code comprising instructions executable by a processor to perform the method of one or more of Aspects 1-11.

Aspect 24: A non-transitory computer-readable medium storing a set of instructions for wireless communication, the set of instructions comprising one or more instructions that, when executed by one or more processors of a device, cause the device to perform the method of one or more of Aspects 1-11.

Aspect 25: An apparatus for wireless communication at a device, comprising a processor; memory coupled with the processor; and instructions stored in the memory and executable by the processor to cause the apparatus to perform the method of one or more of Aspects 12-19.

Aspect 26: A device for wireless communication, comprising a memory and one or more processors coupled to the memory, the one or more processors configured to perform the method of one or more of Aspects 12-19.

Aspect 27: An apparatus for wireless communication, comprising at least one means for performing the method of one or more of Aspects 12-19.

Aspect 28: A non-transitory computer-readable medium storing code for wireless communication, the code comprising instructions executable by a processor to perform the method of one or more of Aspects 12-19.

Aspect 29: A non-transitory computer-readable medium storing a set of instructions for wireless communication, the set of instructions comprising one or more instructions that, when executed by one or more processors of a device, cause the device to perform the method of one or more of Aspects 12-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, the one or more processors configured to:
      transmit, to a second UE, an initial transmission of a transport block via a sidelink unlicensed band;
      receive, from the second UE, a negative acknowledgement (NACK) based at least in part on the initial transmission of the transport block; and
      transmit, to the second UE and based at least in part on the NACK and a retransmission reservation associated with a plurality of retransmission occasions, a retransmission of the transport block via the sidelink unlicensed band in a retransmission occasion of the plurality of retransmission occasions associated with the retransmission reservation.

2. The apparatus of claim 1, wherein each retransmission of the transport block is associated with a respective retransmission reservation that includes the plurality of retransmission occasions, and wherein the retransmission reservation is indicated in sidelink control information transmitted with the initial transmission or with a previous retransmission.

3. The apparatus of claim 1, wherein the one or more processors are further configured to:
   receive a sidelink unlicensed configuration that indicates a plurality of different quantities of retransmission occasions, wherein each quantity of retransmission occasions of the plurality of different quantities of retransmission occasions is associated with one or more of quality of service (QoS) profiles, QoS parameters of services, channel busy ratio (CBR) levels, listen before talk (LBT) failure rates, or LBT success rates; and
   select a quantity for the plurality of retransmission occasions, from among the plurality of different quantities of retransmission occasions indicated in the sidelink unlicensed configuration, based at least in part on one or more of: a QoS profile, a QoS parameter of the service associated with the transport block, a CBR level measured by the first UE or reported by the second UE or a combination of both, an LBT failure rate or an LBT success rate measured by the first UE or reported by the second UE or a combination of both.

4. The apparatus of claim 3, wherein the sidelink unlicensed configuration indicates the plurality of different quantities of retransmission occasions and corresponding spaces between adjacent retransmission occasions.

5. The apparatus of claim 1, wherein the one or more processors are further configured to:
   transmit, to the second UE, a reconfiguration via radio resource control (RRC) signaling or an activation via a medium access control control element (MAC-CE) that indicates a quantity of the plurality of retransmission occasions,
      the quantity of the plurality of retransmission occasions being based at least in part on one or more of a quality of service (QoS) profile or QoS parameter of a service, a channel busy ratio level, a listen before talk (LBT) failure rate, or an LBT success rate; and
receive a confirmation from the second UE based at least in part on the reconfiguration via the RRC signaling or the activation via the MAC-CE.

6. The apparatus of claim 1, wherein the one or more processors are configured to:
transmit the initial transmission of the transport block in a slot or in a mini-slot based at least in part on a successful listen before talk (LBT) in the slot or in the mini-slot; and
transmit the retransmission of the transport block based at least in part on a successful LBT in a slot or in a mini-slot associated with the retransmission occasion for the retransmission of the transport block.

7. The apparatus of claim 1, wherein the one or more processors are further configured to:
determine that the transport block is available for transmission;
determine a quantity of the plurality of retransmission occasions based at least in part on a quality of service (QoS) profile or QoS parameters associated to the transport block, including one or more of: a priority of the transport block, a reliability associated with the transport block, a remaining packet delay budget (PDB), a channel busy ratio level, a listen before talk (LBT) failure rate, or an LBT success rate; and
select a resource pool with the quantity of the retransmission occasions that satisfies a remaining PDB constraint,
the plurality of retransmission occasions being based at least in part on the resource pool and the quantity of the retransmission occasions.

8. The apparatus of claim 1, wherein:
the one or more processors, to transmit the initial transmission of the transport block, are configured to transmit sidelink control information (SCI) associated with the initial transmission of the transport block, wherein the SCI indicates a quantity of the plurality of retransmission occasions; and
the one or more processors are configured to transmit the retransmission of the transport block in the retransmission occasion based at least in part on the SCI that indicates the quantity of the plurality of retransmission occasions.

9. The apparatus of claim 8, wherein the SCI indicates the quantity of the plurality of retransmission occasions and a space in time between adjacent retransmission occasions.

10. The apparatus of claim 8, wherein the one or more processors are further configured to:
start a sidelink inactivity timer having a length based at least in part on a time duration of the plurality of retransmission occasions based at least in part on transmitting the SCI with the initial transmission of the transport block;
start a sidelink hybrid automatic repeat request (HARQ) round-trip time (RTT) timer based at least in part on receiving the NACK from the second UE;
start a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and stop the sidelink inactivity timer at an end of the plurality of retransmission occasions.

11. The apparatus of claim 1, wherein the one or more processors, to transmit the retransmission of the transport block, are configured to transmit sidelink control information (SCI) associated with the retransmission of the transport block, wherein the SCI indicates a quantity of retransmission occasions that releases remaining retransmission occasions for the retransmission of the transport block.

12. An apparatus for wireless communication at a second user equipment (UE), comprising:
one or more memories; and
one or more processors, coupled to the one or more memories, the one or more processors configured to:
transmit, to a first UE, a negative acknowledgement (NACK) based at least in part on an initial transmission of a transport block via a sidelink unlicensed band; and
receive, from the first UE and based at least in part on the NACK and a retransmission reservation associated with a plurality of retransmission occasions, a retransmission of the transport block via the sidelink unlicensed band in a retransmission occasion of the plurality of retransmission occasions associated with retransmission reservation.

13. The apparatus of claim 12, wherein each retransmission of the transport block is associated with a respective retransmission reservation that includes the plurality of retransmission occasions, and wherein the retransmission reservation is received in sidelink control information received with the initial transmission or with a previous retransmission.

14. The apparatus of claim 12, wherein the one or more processors are further configured to:
receive a sidelink unlicensed configuration that indicates a plurality of different quantities of retransmission occasions, wherein each quantity of retransmission occasions of the plurality of different quantities of retransmission occasions is associated with one or more of quality of service (QoS) profiles or parameters of services, channel busy ratio (CBR) levels, listen before talk (LBT) failure rates, or LBT success rates.

15. The apparatus of claim 12, wherein the one or more processors are further configured to:
receive, from the first UE, a reconfiguration via radio resource control (RRC) signaling or an activation via a medium access control control element (MAC-CE) that indicates a quantity of the plurality of retransmission occasions,
the quantity of the plurality of retransmission occasions being based at least in part on one or more of a quality of service (QoS) profile or parameter of a service, a channel busy ratio level, a listen before talk (LBT) failure rate, or an LBT success rate; and
transmit, to the first UE, a confirmation based at least in part on the reconfiguration via the RRC signaling or the activation via the MAC-CE.

16. The apparatus of claim 12, wherein the one or more processors are configured to transmit the NACK based at least in part on a successful listen before talk (LBT) in a slot or in a mini-slot associated with the NACK.

17. The apparatus of claim 12, wherein:
the one or more processors, to receive the initial transmission of the transport block, are configured to receive sidelink control information (SCI) associated with the initial transmission of the transport block, wherein the SCI indicates a quantity of the plurality of retransmission occasions; and the one or more processors are configured to receive the retransmission of the transport block in the retransmission occasion based at least in part on the SCI that indicates the quantity of the plurality of retransmission occasions.

18. The apparatus of claim 17, wherein the one or more processors are further configured to:

start a sidelink inactivity timer having a length based at least in part on a time duration of the plurality of retransmission occasions based at least in part on transmitting the SCI with the initial transmission of the transport block;

start a sidelink hybrid automatic repeat request (HARQ) round-trip time (RTT) timer based at least in part on receiving the NACK from the second UE;

start a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and stop the sidelink inactivity timer at an end of the plurality of retransmission occasions.

19. The apparatus of claim 18, wherein the one or more processors, to receive the retransmission of the transport block, are configured to:

monitor for the retransmission of the transport block while the sidelink HARQ retransmission timer is running; and receive SCI associated with the retransmission of the transport block, wherein the SCI indicates a quantity of retransmission occasions that releases remaining retransmission occasions for the retransmission of the transport block.

20. A method of wireless communication performed by a first user equipment (UE), comprising:

transmitting, to a second UE, an initial transmission of a transport block via a sidelink unlicensed band;

receiving, from the second UE, a negative acknowledgement (NACK) based at least in part on the initial transmission of the transport block; and transmitting, to the second UE and based at least in part on the NACK and a retransmission reservation associated with a plurality of retransmission occasions, a retransmission of the transport block via the sidelink unlicensed band in a retransmission occasion of the plurality of retransmission occasions associated with the retransmission reservation.

21. The method of claim 20, further comprising:

receiving a sidelink unlicensed configuration that indicates a plurality of different quantities of retransmission occasions, wherein each quantity of retransmission occasions of the plurality of different quantities of retransmission occasions is associated with one or more of quality of service (QoS) profiles or parameters of services, channel busy ratio (CBR) levels, listen before talk (LBT) failure rates, or LBT success rates; and selecting a quantity for the plurality of retransmission occasions, from among the plurality of different quantities of retransmission occasions indicated in the sidelink unlicensed configuration, based at least in part on one or more of: a QoS profile or parameter of the service associated with the transport block, a CBR level measured by the first UE or reported by the second UE or a combination of both, an LBT failure rate or an LBT success rate measured by the first UE or reported by the second UE or a combination of both.

22. The method of claim 20, further comprising:

transmitting, to the second UE, a reconfiguration via radio resource control (RRC) signaling or an activation via a medium access control control element (MAC-CE) that indicates a quantity of the plurality of retransmission occasions, the quantity of the plurality of retransmission occasions being based at least in part on one or more of a quality of service (QoS) profile or parameter of a service, a channel busy ratio level, a listen before talk (LBT) failure rate, or an LBT success rate; and receiving a confirmation from the second UE based at least in part on the reconfiguration via the RRC signaling or the activation via the MAC-CE.

23. The method of claim 20, wherein:

transmitting the initial transmission of the transport block in a slot or in a mini-slot based at least in part on a successful listen before talk (LBT) in the slot; and transmitting the retransmission of the transport block based at least in part on a successful LBT in a slot or in a mini-slot associated with the retransmission occasion for the retransmission of the transport block.

24. The method of claim 20, further comprising:

determining that the transport block is available for transmission;

determining a quantity of the plurality of retransmission occasions based at least in part on a quality of service (QoS) profile or parameters associated to the transport block, including one or more of: a priority of the transport block, a reliability associated with the transport block, a remaining packet delay budget (PDB), a channel busy ratio level, a listen before talk (LBT) failure rate, or an LBT success rate; and selecting a resource pool with the quantity of the retransmission occasions that satisfies a remaining PDB constraint, the plurality of retransmission occasions being based at least in part on the resource pool and the quantity of the retransmission occasions.

25. The method of claim 20, wherein:

transmitting the initial transmission of the transport block comprises transmitting sidelink control information (SCI) associated with the initial transmission of the transport block, wherein the SCI indicates a quantity of the plurality of retransmission occasions; and transmitting the retransmission of the transport block in the retransmission occasion is based at least in part on the SCI that indicates the quantity of the plurality of retransmission occasions.

26. The method of claim 25, further comprising:

starting a sidelink inactivity timer having a length based at least in part on a time duration of the plurality of retransmission occasions based at least in part on transmitting the SCI with the initial transmission of the transport block;

starting a sidelink hybrid automatic repeat request (HARQ) round-trip time (RTT) timer based at least in part on receiving the NACK from the second UE;

starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and
stopping the sidelink inactivity timer at an end of the plurality of retransmission occasions.

27. The method of claim 20, wherein:
transmitting the retransmission of the transport block comprises transmitting sidelink control information (SCI) associated with the retransmission of the transport block, wherein the SCI indicates a quantity of retransmission occasions that releases remaining retransmission occasions for the retransmission of the transport block.

28. A method of wireless communication performed by a second user equipment (UE), comprising:
transmitting, to a first UE, a negative acknowledgement (NACK) based at least in part on an initial transmission of a transport block via a sidelink unlicensed band; and
receiving, from the first UE and based at least in part on the NACK and a retransmission reservation associated with a plurality of retransmission occasions, a retransmission of the transport block via the sidelink unlicensed band in a retransmission occasion of the plurality of retransmission occasions associated with retransmission reservation.

29. The method of claim 28, further comprising:
receiving, from the first UE, a reconfiguration via radio resource control (RRC) signaling or an activation via a medium access control control element (MAC-CE) that indicates a quantity of the plurality of retransmission occasions,
the quantity of the plurality of retransmission occasions being based at least in part on one or more of a quality of service (QoS) profile or parameter of a service, a channel busy ratio level, a listen before talk (LBT) failure rate, or an LBT success rate; and
transmitting, to the first UE, a confirmation based at least in part on the reconfiguration via the RRC signaling or the activation via the MAC-CE.

30. The method of claim 29, further comprising:
starting a sidelink inactivity timer having a length based at least in part on a time duration of the plurality of retransmission occasions based at least in part on transmitting sidelink control information (SCI) with the initial transmission of the transport block;
starting a sidelink hybrid automatic repeat request (HARQ) round-trip time (RTT) timer based at least in part on receiving the NACK from the second UE;
starting a sidelink HARQ retransmission timer having a length based at least in part on the time duration of the plurality of retransmission occasions or a remaining quantity of retransmission occasions based at least in part on an expiry of the sidelink HARQ RTT timer, wherein the expiry of the sidelink HARQ RTT timer corresponds to a timing of the retransmission of the transport block; and
stopping the sidelink inactivity timer at an end of the plurality of retransmission occasions.

* * * * *